United States Patent
Manolakos et al.

(10) Patent No.: US 11,963,212 B2
(45) Date of Patent: Apr. 16, 2024

(54) USING NULL RESOURCE ELEMENTS FOR DEMODULATION INTERFERENCE ESTIMATION

(71) Applicant: QUALCOMM Incorporated, San Diego, CA (US)

(72) Inventors: Alexandros Manolakos, Escondido, CA (US); Muhammad Sayed Khairy Abdelghaffar, San Jose, CA (US); Weimin Duan, San Diego, CA (US); Pavan Kumar Vitthaladevuni, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/035,093

(22) Filed: Sep. 28, 2020

(65) Prior Publication Data

US 2021/0105785 A1    Apr. 8, 2021

(51) Int. Cl.
| | |
|---|---|
| *H04W 72/541* | (2023.01) |
| *H04J 13/16* | (2011.01) |
| *H04L 5/00* | (2006.01) |
| *H04W 72/21* | (2023.01) |
| *H04W 72/23* | (2023.01) |

(52) U.S. Cl.
CPC ........... *H04W 72/541* (2023.01); *H04J 13/16* (2013.01); *H04L 5/0051* (2013.01); *H04W 72/21* (2023.01); *H04W 72/23* (2023.01)

(58) Field of Classification Search
CPC ........... H04W 72/082; H04W 72/0413; H04W 72/042; H04J 13/16; H04L 5/0051

USPC ......................................................... 370/252
See application file for complete search history.

(56) References Cited

U.S. PATENT DOCUMENTS

| | | | | |
|---|---|---|---|---|
| 10,028,267 | B2 * | 7/2018 | Nimbalker | ............... H04L 5/001 |
| 2012/0120907 | A1 * | 5/2012 | Kishigami | ............ H04L 5/0051 |
| | | | | 370/329 |
| 2015/0249517 | A1 * | 9/2015 | Seo | ........................ H04L 5/0051 |
| | | | | 370/329 |

(Continued)

OTHER PUBLICATIONS

"Discussion on Bursty Interference Measurement Resources," 3GPP TSG RAN WG1 Meeting #90, Aug. 21-25, 2017, Prague, Czech Republic, 6 pages.

(Continued)

*Primary Examiner* — Chi Tang P Cheng
(74) *Attorney, Agent, or Firm* — Arun Swain

(57) ABSTRACT

Various aspects of the present disclosure generally relate to wireless communication. In some aspects, a user equipment (UE) may receive downlink control information (DCI) that includes an indication of a null resource element pattern. The null resource element pattern may be indicated in the DCI using: a value of an antenna port field that also indicates one or more demodulation reference signal (DMRS) ports for the UE and a number of DMRS code-division multiplexing groups without data, or one or more zero power downlink reference signals. The UE may perform one or more demodulation interference measurements based at least in part on the null resource element pattern. The UE may demodulate a downlink communication based at least in part on performing the one or more demodulation interference measurements. Numerous other aspects are provided.

30 Claims, 13 Drawing Sheets

(56) References Cited

U.S. PATENT DOCUMENTS

| | | | | |
|---|---|---|---|---|
| 2016/0036542 A1* | 2/2016 | Gong | .................... | H04W 24/10 |
| | | | | 370/329 |
| 2018/0026688 A1* | 1/2018 | Weng | .................... | H04L 1/0033 |
| | | | | 375/267 |
| 2018/0331742 A1* | 11/2018 | Yum | .................... | H04B 7/0626 |
| 2018/0359069 A1 | 12/2018 | Nam et al. | | |
| 2019/0123869 A1* | 4/2019 | Kakishima | ............ | H04L 5/0048 |
| 2020/0092032 A1* | 3/2020 | Zhang | .................... | H04W 76/27 |
| 2020/0112407 A1* | 4/2020 | Yum | .................... | H04W 24/10 |

OTHER PUBLICATIONS

International Search Report and Written Opinion—PCT/US2020/053340—ISA/EPO—dated Dec. 18, 2020.
NTT DoCoMo: "Views on CSI Measurement for NR," 3GPP Draft, 3GPP TSG RAN WG1 Meeting 91, R1-1720801_CSI_Measurement, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017 (Nov. 18, 2017), XP051370230, pp. 1-12, Retrieved from the Internet: URL: http://www.3gpp.org/ftp/tsg%5Fran/WG1%5FRL1/TSGR1%5F91/Docs/ [retrieved on Nov. 18, 2017] p. 1. paragraph 2—p. 2. paragraph 2.2.
Qualcomm Incorporated: "Discussion on Bursty Interference Measurement Resources," 3GPP Draft, 3GPP TSG RAN WG1 Meeting 90bis, R1-1718552, 3rd Generation Partnership Project (3GPP), Mobile Competence Centre, 650, Route Des Lucioles, F-06921, Sophia-Antipolis Cedex, France, vol. RAN WG1, No. Prague, CZ, Oct. 9, 2017- Oct. 13, 2017, Oct. 8, 2017 (Oct. 8, 2017), XP051341733, pp. 1-5, Retrieved from the Internet: URL: http://www.3gpp.org/ftp/Meetings_3GPP_SYNC/RAN1/Docs/ [retrieved on Oct. 8, 2017] p. 2. paragraph 2.1—p. 3. paragraph 2.4 p. 5. paragraph 3 figures 2(a). 2(b).

* cited by examiner

USING NULL RESOURCE ELEMENTS FOR DEMODULATION INTERFERENCE ESTIMATION

CROSS-REFERENCE TO RELATED APPLICATION

This Patent Application claims priority to Greece Patent Application No. 20190100431, filed on Oct. 3, 2019, entitled "USING NULL RESOURCE ELEMENTS FOR DEMODULATION INTERFERENCE ESTIMATION," and assigned to the assignee hereof. The disclosure of the prior Application is considered part of and is incorporated by reference in this Patent Application.

FIELD OF THE DISCLOSURE

Aspects of the present disclosure generally relate to wireless communication, and specifically, to techniques and apparatuses for using null resource elements for demodulation interference estimation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation.

Time slot structures for transmissions in NR are more flexible than LTE's time slot structure. Transmission with flexible slots may result in highly dynamic and bursty inter-cell interference. This is an issue because scheduling and demodulation performance may be dependent on bursty interference conditions at transmission time. Current interference measurements using, for example, a channel state information reference signal (CSI-RS) or an interference measurement resource (IMR) only provide long-term measurements. These long-term measurements may lead to over conservative decisions that decrease system throughput. Furthermore, although scheduling entities may control some bursty interference through fast scheduling coordination, such coordination may take more time, cost more resources, and be inadequate for ultra low latency applications.

SUMMARY

In some aspects, a method of wireless communication performed by a user equipment (UE) includes receiving downlink control information (DCI) that includes an indication of a null resource element pattern. The null resource element pattern may be indicated in the DCI using: a value of an antenna port field that also indicates one or more DMRS ports for the UE and a number of DMRS code-division multiplexing groups without data, or one or more zero power downlink reference signals. The method may include performing one or more demodulation interference measurements based at least in part on the null resource element pattern. The method may include demodulating a downlink communication based at least in part on performing the one or more demodulation interference measurements.

In some aspects, a method of wireless communication performed by a UE includes transmitting, to a base station, an indication of a recommended null resource element pattern or a recommended number of null resource elements. The method may include receiving, from the base station, an indication of a null resource element pattern based at least in part on the indication of the recommended null resource element pattern or the recommended number of null resource elements. The method may include performing one or more demodulation interference measurements based at least in part on the null resource element pattern. The method may include demodulating a downlink communication based at least in part on performing the one or more demodulation interference measurements.

In some aspects, a method of wireless communication performed by a base station includes transmitting, to a UE, DCI that includes an indication of a null resource element pattern. The null resource element pattern may be indicated in the DCI using: a value of an antenna port field that also indicates one or more DMRS ports for the UE and a number of DMRS code-division multiplexing groups without data, or a zero power downlink reference signal. The method may include transmitting a downlink communication based at least in part on the null resource element pattern indicated in the DCI.

In some aspects, a method of wireless communication performed by a base station includes receiving, from a UE, an indication of a recommended null resource element pattern or a recommended number of null resource elements. The method may include transmitting, to the UE, an indication of a null resource element pattern based at least in part on the indication of the recommended null resource element pattern or the recommended number of null resource elements. The method may include transmitting a downlink communication to the UE based at least in part on the null resource element pattern.

In some aspects, a UE for wireless communication includes a memory and one or more processors operatively coupled to the memory The memory and the one or more processors may be configured to receive DCI that includes an indication of a null resource element pattern. The null resource element pattern may be indicated in the DCI using: a value of an antenna port field that also indicates one or more DMRS ports for the UE and a number of DMRS code-division multiplexing groups without data, or one or more zero power downlink reference signals. The memory and the one or more processors may be configured to perform one or more demodulation interference measurements based at least in part on the null resource element pattern. The memory and the one or more processors may be configured to demodulate a downlink communication based at least in part on performing the one or more demodulation interference measurements.

In some aspects, a UE for wireless communication includes a memory and one or more processors operatively coupled to the memory. The memory and the one or more processors may be configured to transmit, to a base station, an indication of a recommended null resource element pattern or a recommended number of null resource elements. The memory and the one or more processors may be configured to receive, from the base station, an indication of a null resource element pattern based at least in part on the indication of the recommended null resource element pattern or the recommended number of null resource elements. The memory and the one or more processors may be configured to perform one or more demodulation interference measurements based at least in part on the null resource element pattern. The memory and the one or more processors may be configured to demodulate a downlink communication based at least in part on performing the one or more demodulation interference measurements.

In some aspects, a base station for wireless communication includes a memory and one or more processors operatively coupled to the memory. The memory and the one or more processors may be configured to transmit, to a UE, DCI that includes an indication of a null resource element pattern. The null resource element pattern may be indicated in the DCI using: a value of an antenna port field that also indicates one or more DMRS ports for the UE and a number of DMRS code-division multiplexing groups without data, or a zero power downlink reference signal. The memory and the one or more processors may be configured to transmit a downlink communication based at least in part on the null resource element pattern indicated in the DCI.

In some aspects, a base station for wireless communication includes a memory and one or more processors operatively coupled to the memory. The memory and the one or more processors may be configured to receive, from a UE, an indication of a recommended null resource element pattern or a recommended number of null resource elements. The memory and the one or more processors may be configured to transmit, to the UE, an indication of a null resource element pattern based at least in part on the indication of the recommended null resource element pattern or the recommended number of null resource elements. The memory and the one or more processors may be configured to transmit a downlink communication to the UE based at least in part on the null resource element pattern.

In some aspects, a non-transitory computer-readable medium storing a set of instructions for wireless communication includes one or more instructions that, when executed by one or more processors of a UE, cause the UE to receive DCI that includes an indication of a null resource element pattern. The null resource element pattern may be indicated in the DCI using: a value of an antenna port field that also indicates one or more DMRS ports for the UE and a number of DMRS code-division multiplexing groups without data, or one or more zero power downlink reference signals. The one or more instructions may cause the UE to perform one or more demodulation interference measurements based at least in part on the null resource element pattern. The one or more instructions may cause the UE to demodulate a downlink communication based at least in part on performing the one or more demodulation interference measurements.

In some aspects, a non-transitory computer-readable medium storing a set of instructions for wireless communication includes one or more instructions that, when executed by one or more processors of an UE, cause the UE to transmit, to a base station, an indication of a recommended null resource element pattern or a recommended number of null resource elements. The one or more instructions may cause the UE to receive, from the base station, an indication of a null resource element pattern based at least in part on the indication of the recommended null resource element pattern or the recommended number of null resource elements. The one or more instructions may cause the UE to perform one or more demodulation interference measurements based at least in part on the null resource element pattern. The one or more instructions may cause the UE to demodulate a downlink communication based at least in part on performing the one or more demodulation interference measurements.

In some aspects, a non-transitory computer-readable medium storing a set of instructions for wireless communication includes one or more instructions that, when executed by one or more processors of a base station, cause the base station to transmit, to a UE, DCI that includes an indication of a null resource element pattern. The null resource element pattern may be indicated in the DCI using: a value of an antenna port field that also indicates one or more DMRS ports for the UE and a number of DMRS code-division multiplexing groups without data, or a zero power downlink reference signal. The one or more instructions may cause the base station to transmit a downlink communication based at least in part on the null resource element pattern indicated in the DCI.

In some aspects, a non-transitory computer-readable medium storing a set of instructions for wireless communication includes one or more instructions that, when executed by one or more processors of a base station, cause the base station to receive, from a UE, an indication of a recommended null resource element pattern or a recommended number of null resource elements. The one or more instructions may cause the base station to transmit, to the UE, an indication of a null resource element pattern based at least in part on the indication of the recommended null resource element pattern or the recommended number of null resource elements. The one or more instructions may cause the base station to transmit a downlink communication to the UE based at least in part on the null resource element pattern.

In some aspects, an apparatus for wireless communication includes means for receiving DCI that includes an indication of a null resource element pattern. The null resource element pattern may be indicated in the DCI using: a value of an antenna port field that also indicates one or more DMRS ports for the UE and a number of DMRS code-division multiplexing groups without data, or one or more zero power downlink reference signals. The apparatus may include means for performing one or more demodulation interference measurements based at least in part on the null resource element pattern. The apparatus may include means for demodulating a downlink communication based at least in part on performing the one or more demodulation interference measurements.

In some aspects, an apparatus for wireless communication includes means for transmitting, to a base station, an indication of a recommended null resource element pattern or a recommended number of null resource elements. The apparatus may include means for receiving, from the base station, an indication of a null resource element pattern based at least in part on the indication of the recommended null resource element pattern or the recommended number of null resource elements. The apparatus may include means for performing one or more demodulation interference measurements based at least in part on the null resource element pattern. The apparatus may include means for demodulating a downlink communication based at least in part on performing the one or more demodulation interference measurements.

In some aspects, an apparatus for wireless communication includes means for transmitting, to a UE, DCI that includes an indication of a null resource element pattern. The null resource element pattern may be indicated in the DCI using: a value of an antenna port field that also indicates one or more DMRS ports for the UE and a number of DMRS code-division multiplexing groups without data, or a zero power downlink reference signal. The apparatus may include means for transmitting a downlink communication based at least in part on the null resource element pattern indicated in the DCI.

In some aspects, an apparatus for wireless communication includes means for receiving, from a UE, an indication of a recommended null resource element pattern or a recommended number of null resource elements. The apparatus may include means for transmitting, to the UE, an indication of a null resource element pattern based at least in part on the indication of the recommended null resource element pattern or the recommended number of null resource elements. The apparatus may include means for transmitting a downlink communication to the UE based at least in part on the null resource element pattern.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
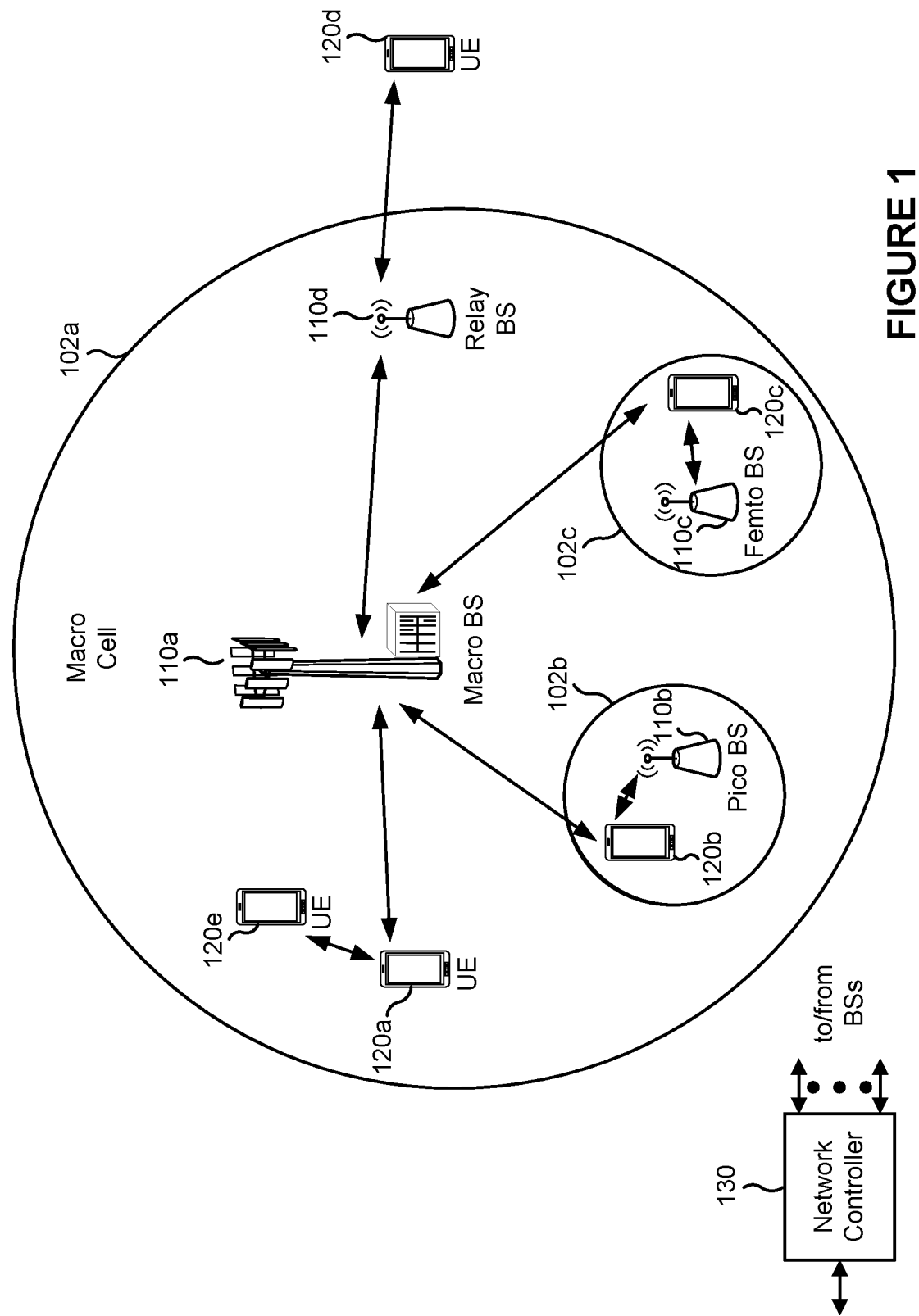
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms among other examples, or combinations thereof (collectively referred to as "elements"). These elements may be implemented using hardware, software, or combinations thereof. Whether such elements are implemented as hardware or software depends upon the particular application and design constraints imposed on the overall system.

In NR, transmission time slot structures are far more flexible than Long Term Evolution (LTE) slot structures. This may result in bursty interference. For bursty interference management (BIM), a user equipment (UE) may estimate interference (noise) at demodulation. The UE may estimate interference using a recurrent neural network (Rnn) matrix corresponding to N×N resource elements. N is a number of receive antenna ports and may be referred to as a rank. For example, the UE may determine a 4×4 Rnn matrix for rank 4. The UE may calculate an inverse of the Rnn matrix and use the Rnn matrix to cancel interference. However, with higher ranks, such as rank 8, an 8×8 Rnn matrix may involve four times the number of resource elements for which the UE has to estimate interference. Consequently, the UE may use more computing resources and may have difficulty estimating the interference correctly.

Some aspects, as described herein, configure a UE to receive, from a base station (BS), downlink control information (DCI) that indicates a null resource element pattern of null resource elements. A null resource element for a UE may have a null tone; that is, there is no transmission power at the time and frequency associated with the null resource element for the UE. The null resource element pattern may indicate null resource elements that are spread out in a resource block over time, frequency, or both. The UE may perform demodulation interference measurements based at least in part on the null resource element pattern and demodulate a downlink communication accordingly. The UE may save processing resources because there is less computation involved with performing demodulation interference measurements for null resource elements. For example, for each non-null resource element, the UE determines a channel estimate, and cancels the channel estimate before calculating interference for the non-null resource element. For null resource elements, the UE may proceed with measuring interference without first determining, and subsequently canceling, any channel estimates for the null resource elements.

Furthermore, the BS may indicate the null resource element pattern in the DCI using a value of an antenna port field that also indicates one or more demodulation reference signal (DMRS) ports for the UE and a number of DMRS code-division multiplexing groups without data. Additionally or alternatively, the BS may indicate the null resource element pattern in the DCI using a zero power channel state information reference signal (ZP CSI-RS) resource set. Because the BS may signal the null resource element pattern in the DCI using an antenna port field or a ZP CSI-RS resource set, the UE may save processing resources that the UE may otherwise have used to determine a null resource element pattern and determine when to use the null resource element pattern.

FIG. 1 is a block diagram illustrating an example wireless network in accordance with various aspects of the present disclosure. The wireless network may be an LTE network or some other wireless network, such as a 5G or NR network. The wireless network may include a quantity of BSs 110 (as indicated by BS 110a, BS 110b, BS 110c, and BS 110d) and other network entities. A BS is an entity that communicates with UE(s) and may also be referred to as a Node B, an eNodeB, an eNB, a gNB, a NR BS, a 5G node B (NB), an access point (AP), or a transmit receive point (TRP) among other examples, or combinations thereof (these terms are used interchangeably herein). Each BS may provide communication coverage for a particular geographic area. In the Third Generation Partnership Project (3GPP), the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection or a virtual network among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples, or combinations thereof. Each frequency may support a single RAT in a given geographic area in order to avoid interference between wireless networks of different RATs. In some examples, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol among other examples, or combinations thereof), or a mesh network among other examples, or combinations thereof. In this example, the UE 120 may perform scheduling operations, resource selection operations, or other operations described elsewhere herein as being performed by BS 110.

Figure 2:
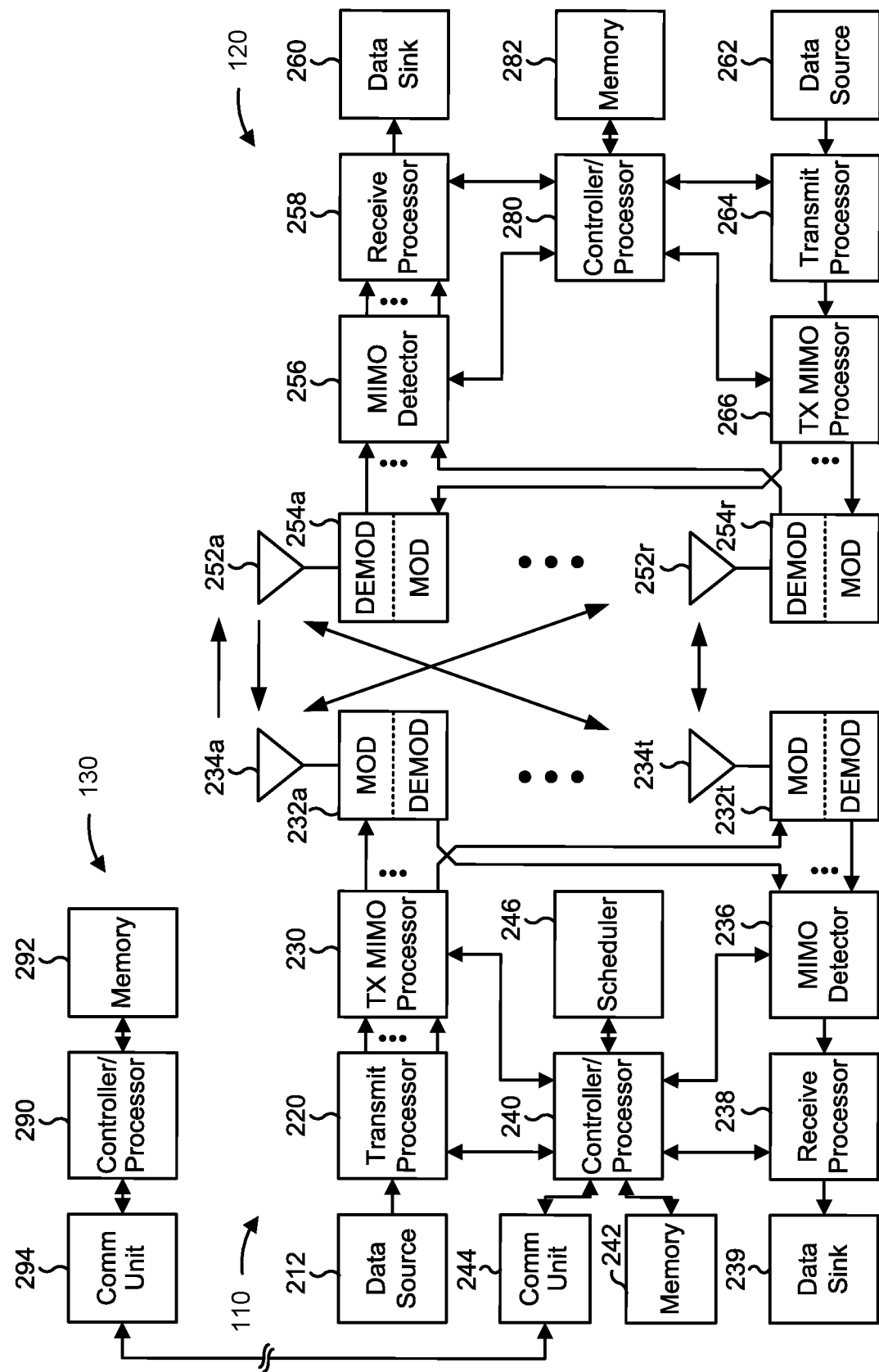
FIG. 2 is a block diagram illustrating an example base station in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples, or combinations thereof) and control information (for example, CQI requests, grants, or upper layer signaling among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM among other examples, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a CQI among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ or CQI among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM) among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, or any other component(s) of FIG. 2 may perform one or more techniques associated with using null resource elements for demodulation interference estimation, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink or uplink.

In some aspects, the UE includes means for receiving DCI that includes an indication of a null resource element pattern, the null resource element pattern being indicated in the DCI using: a value of an antenna port field that also indicates one or more DMRS ports for the UE and a number of DMRS code-division multiplexing groups without data, or one or more zero power downlink reference signals; means for performing one or more demodulation interference measurements based at least in part on the null resource element pattern; and/or means for demodulating a downlink communication based at least in part on performing the one or more demodulation interference measurements.

In some aspects, the UE includes means for receiving a configuration that indicates a set of null resource element patterns, wherein the null resource element pattern indicated in the DCI is selected from the set of null resource element patterns. In some aspects, the UE includes means for interpreting the null resource element pattern indicated in the DCI based at least in part on a rank used by the UE, a combination of DMRS ports used by the UE, a maximum rank configured for the UE, or a combination thereof. In some aspects, the UE includes means for determining that a maximum rank configured for PDSCH reception of the UE satisfies a threshold; and/or means for performing the one or more demodulation interference measurements using the null resource element pattern based at least in part on determining that the maximum rank configured for PDSCH reception of the UE satisfies the threshold.

In some aspects, the UE includes means for transmitting, to a base station, an indication of a recommended null resource element pattern or a recommended number of resource elements for the null resource element pattern. In some aspects, the UE includes means for indicating the recommended null resource element pattern or the recommended number of resource elements for the null resource element pattern in at least one of a UE capability report or a CSI report. In some aspects, the UE includes means for receiving a CSI report configuration that requests the UE to report the recommended null resource element pattern or the recommended number of resource elements for the null resource element pattern in the CSI report.

In some aspects, the UE includes means for transmitting, to a base station, an indication of a recommended null resource element pattern or a recommended number of null resource elements; means for receiving, from the base station, an indication of a null resource element pattern based at least in part on the indication of the recommended null resource element pattern or the recommended number of null resource elements; means for performing one or more demodulation interference measurements based at least in part on the null resource element pattern; and/or means for demodulating a downlink communication based at least in part on performing the one or more demodulation interference measurements. In some aspects, the UE includes means for receiving a CSI report configuration that requests the UE to report the recommended null resource element pattern or the recommended number of null resource elements in the CSI report.

In some aspects, the base station includes means for transmitting, to a UE, DCI that includes an indication of a null resource element pattern, the null resource element pattern being indicated in the DCI using: a value of an antenna port field that also indicates one or more DMRS ports for the UE and a number of DMRS code-division multiplexing groups without data, or a zero power downlink reference signal; and/or means for transmitting a downlink communication based at least in part on the null resource element pattern indicated in the DCI.

In some aspects, the base station includes means for transmitting a configuration that indicates a set of null resource element patterns and selecting the null resource element pattern to be indicated in the DCI from the set of null resource element patterns. In some aspects, the base station includes means for determining that a number of receive antennas reported by the UE satisfies a threshold; and/or means for indicating a null resource element pattern based at least in part on determining that the number of receive antennas reported by the UE satisfies the threshold. In some aspects, the base station includes means for receiving, from the UE, an indication of a recommended null resource element pattern or a recommended number of resource elements for the null resource element pattern.

In some aspects, the base station includes means for determining whether to select the null resource element pattern based at least in part on the recommended null resource element pattern or the recommended number of resource elements for the null resource element pattern. In some aspects, the base station includes means for transmitting a CSI report configuration that requests the UE to report the recommended null resource element pattern or the recommended number of resource elements for the null resource element pattern in the CSI report.

In some aspects, the base station includes means for receiving, from a UE, an indication of a recommended null resource element pattern or a recommended number of null resource elements; means for transmitting, to the UE, an indication of a null resource element pattern based at least in part on the indication of the recommended null resource element pattern or the recommended number of null resource elements; and/or means for transmitting a downlink communication to the UE based at least in part on the null resource element pattern.

The means for the UE to perform operations described herein may include, for example, antenna 252, demodulator 254, MIMO detector 256, receive processor 258, transmit processor 264, TX MIMO processor 266, modulator 254, controller/processor 280, and/or memory 282. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

Figure 3:
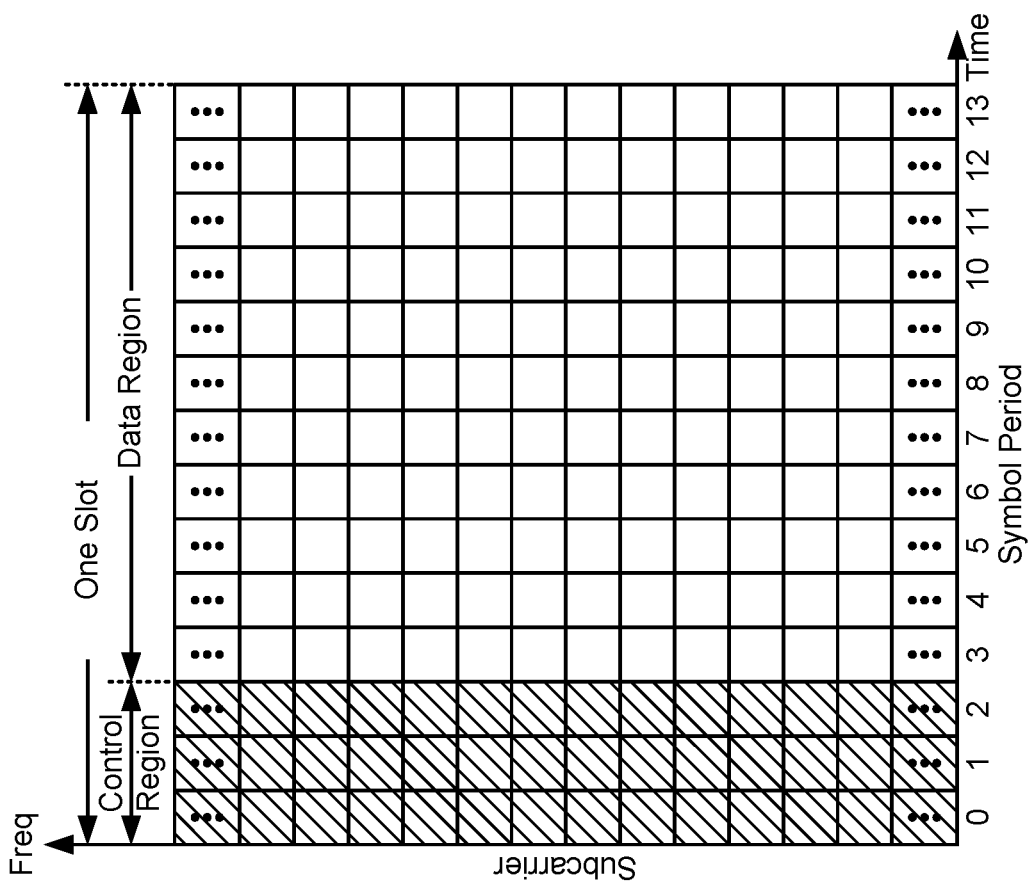
FIG. 3 is a block diagram illustrating a slot format in accordance with various aspects of the present disclosure.

FIG. 3 is a block diagram illustrating a slot format in accordance with various aspects of the present disclosure. The available time frequency resources may be partitioned into resource blocks. Each resource block may cover a set of subcarriers (for example, 12 subcarriers) in one slot and may include a number of resource elements. Each resource element may cover one subcarrier in one symbol period (for example, in time) and may be used to send one modulation symbol, which may be a real or complex value. Each block may have 14 symbol periods (0-13).

As indicated by the block diagram of FIG. 3, symbol periods 0, 1, and 2 may be a control region for control signaling, and symbol periods 3-13 may be reserved for data. Symbols for a demodulation reference signal (DMRS) may be located in, for example, symbol period 2 of the control region. A receiver may use the DMRS to estimate a radio channel for demodulation. The DMRS is UE-specific and may be transmitted only when necessary.

Resource elements for the DMRS may be divided into multiple code division multiplexing (CDM) groups. CDM involves combining multiple signals for simultaneous transmission over a common frequency band. A DMRS in a resource block may include up to three CDM groups in symbol period 2, such as CDM group 0, CDM group 1, and CDM group 2. There are twelve subcarriers in a resource block so that means there may be four resource elements for each CDM group. The UE may receive data in symbol period 2 for physical downlink shared channel (PDSCH) DMRS configuration. For example, the resource elements in CDM group 0 in symbol period 2 may have configuration data, while resource elements of CDM groups 1 and 2 in symbol period 2 may not have configuration data. A BS may indicate how many CDM groups do not have configuration data. In this example, that number would be two.

The BS may use an antenna port table to indicate the number of DMRS CDM groups without data, as well as the PDSCH DMRS ports. The BS may provide a value of the antenna port table in a field of a DCI message. The value corresponds to a unique combination of a number of DMRS CDM groups without data and DMRS ports scheduled to the UE. Separate values may apply when one of two codewords are enabled or when both codewords are enabled. A PDSCH rank may be determined based at least in part on how many DMRS port indices are signaled.

As indicated above, in NR, transmission time slot structures are more flexible than LTE slot structures. In fact, NR provides for mini-slots. This flexibility may result in bursty inter-cell interference. "Bursty interference" may refer to interference that comes and goes quickly. For bursty interference management (BIM), a UE may estimate, for a resource element for the UE, interference (caused at least in party by bursty interference) or transmission noise. The UE may estimate interference for resource elements that correspond to a recurrent neural network (Rnn) matrix of N×N resource elements. An Rnn matrix may be, for example, a 4×4 Rnn matrix (rank 4), and the UE may calculate interference for resource elements in the Rnn matrix. The UE may calculate an inverse of the Rnn matrix and apply the inverse of the Rnn matrix to the resource elements, to cancel interference for the resource elements. However, with higher ranks, such as rank 8, an 8×8 Rnn matrix may involve four times as many resource elements as a 4×4 Rnn matrix. This means the UE may estimate interference for four times as many resource elements. Consequently, the UE may use more computing resources for operations involving more resource elements. Furthermore, the UE may have difficulty estimating the interference correctly, because the UE may determine a channel estimate and then cancel that estimate from the signal in order to calculate the noise. Calculating the noise by subtraction may not be accurate and may lead the UE to use more processing resources to account for inaccurate calculations.

In some aspects described herein, a BS transmits, to a UE, DCI that indicates a null resource element pattern. The null resource element pattern may indicate null resource elements that are spread out over time, frequency, or both. The UE may perform demodulation interference measurements based at least in part on the null resource element pattern and demodulate a downlink communication accordingly. The UE may save processing resources because there is less computation involved with performing demodulation interference measurements for null resource elements than for non-null resource elements. Because the UE does not determine channel estimations for the null resource elements, the UE may save processing resources typically used for determining channel estimations, canceling the estimations, and correcting for inaccuracies due to the cancellations. In some aspects, the BS may indicate the null resource element pattern in the DCI using a value of an antenna port field or a ZP CSI-RS resource set. Because the BS may signal the null resource element pattern in the DCI using an antenna port field or a ZP CSI-RS, the UE may save processing resources the UE may have otherwise used to determine a null resource element pattern as well as when to use the null resource element pattern.

Figure 4:
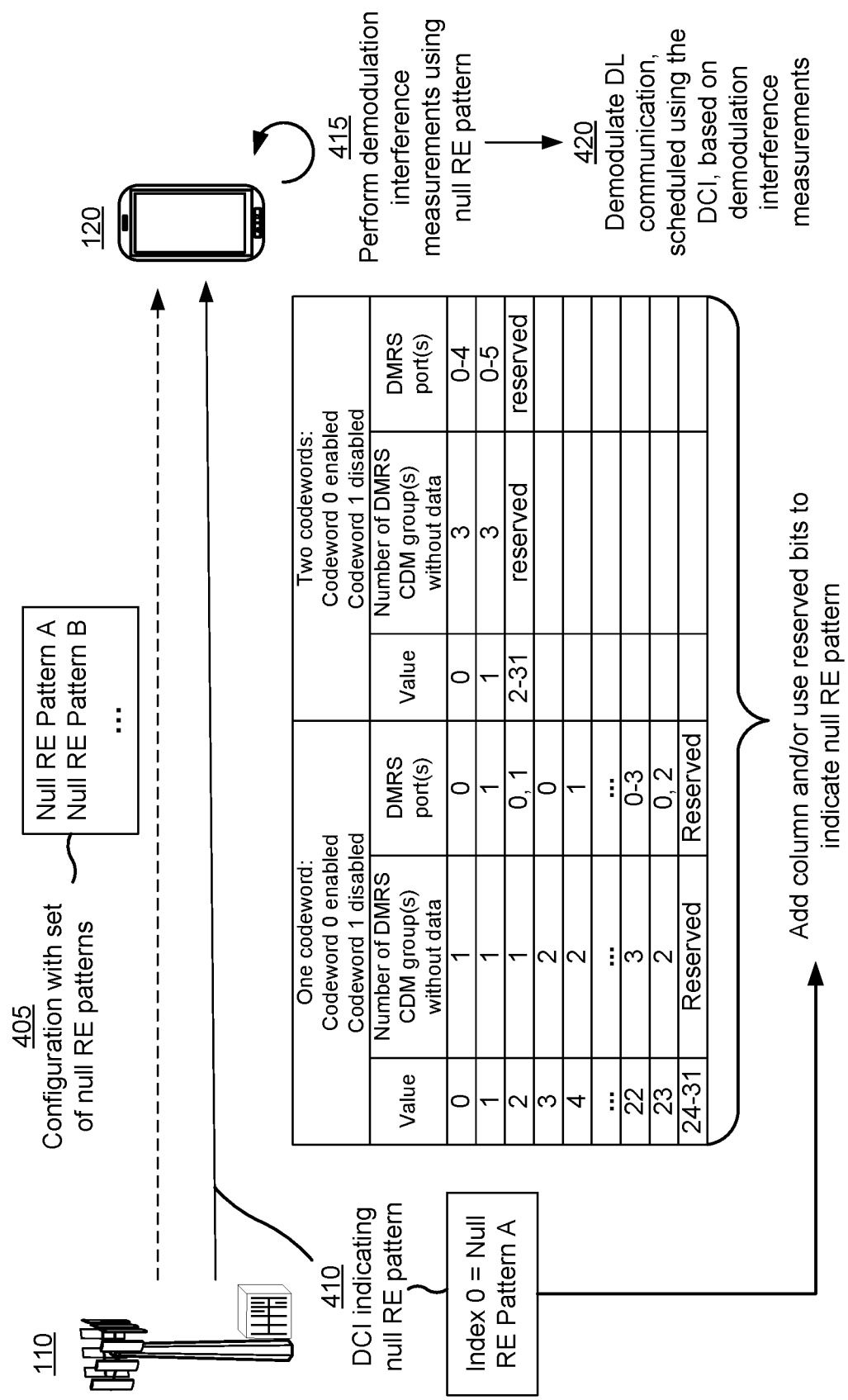
FIG. 4 is a diagram illustrating the use of null resource elements signaled in an antenna port field for demodulation interference estimation in accordance with various aspects of the present disclosure.

FIG. 4 is a diagram illustrating the use of null resource elements signaled in an antenna port field for demodulation interference estimation in accordance with various aspects of the present disclosure. Base station (BS) 110 may be configured to communicate with user equipment (UE) 120, but UE 120 may be experiencing bursty interference. UE 120 may estimate interference for resource elements and may use a recurrent neural network (Rnn) matrix of N×N resource elements (where N is the number of receive antenna ports, or the rank) to cancel at least some of this bursty interference. For example, BS 110 may send transmissions to UE 120 with a rank of 8. UE 120 may use an Rnn matrix that is 8×8 and thus UE 120 may use more processing resources than if the UE was using an Rnn matrix that is less than 8×8, such as 4×4.

In some aspects, BS 110 may configure UE 120 to use a null resource element pattern. BS 110 may select a null resource element pattern based at least in part on information about communication conditions, measurement information, or rank among other examples. BS 110 may indicate the null resource element pattern in downlink control information (DCI) to UE 120. The null resource element pattern may indicate null resource elements that are spread out in a resource block over time, frequency, or both. UE 120 may perform demodulation interference measurements based at least in part on the null resource element pattern and demodulate downlink transmissions from BS 110 accordingly.

In a first operation 405, BS 110 may configure UE 120 with a set of null resource element (RE) patterns. For example, BS 110 may use radio resource control (RRC) signaling to send UE 120 a configuration indicating the set of null RE patterns. The configuration may indicate different sets of null RE patterns for different ranks, different combinations of DMRS ports, or both different ranks and combinations of DMRS ports, among other examples. For example, the configuration may include one or more null RE patterns for each rank, or one or more null RE patterns for a particular number of null REs for each rank. For each rank, the configuration may include different combinations of DMRS ports. As an example, one value in the configuration may indicate a rank of 8 with DMRS ports 0-3. The value may further indicate a pattern of null REs in a resource block. In some examples, BS 110 may indicate these values in a third column of an antenna port table. As another example, another value in the configuration may indicate a rank of 8 with DMRS ports 4-5. This value may indicate a different pattern of null REs in a resource block. UE 120 may be configured with information about which particular REs are nulled in a particular null RE pattern based at least in part on being preconfigured with possible null RE patterns, a configuration from BS 110, or a combination thereof.

The null REs may be in one or more subcarriers of a resource block. Additionally or alternatively, the null REs may be in one or more symbol periods of a resource block. In some aspects, the null REs may be spread out into multiple subcarriers and multiple symbol periods. The null REs may be located in a physical data shared channel (PDSCH) region of the resource block, in a demodulation reference signal (DMRS) symbol period of the resource block, or in both regions. In some aspects, each null RE pattern may correspond to a unique arrangement of null REs in time and frequency within the resource block. For example, a first null RE pattern in the set of null RE patterns may specify a first arrangement of null REs in the resource block. Similarly, a second null RE pattern in the set of null RE patterns may specify a different arrangement of null REs in the resource block.

BS 110 may determine the null REs based at least in part on information about mini-slots, cross-link interference, reference signal transmissions, among other examples. BS 110 may arrange the null REs such that they are randomized, evenly spaced, or clustered, among other example patterns. BS 110 may become aware of null RE positions that are more effective than other null RE positions or may obtain relevant information from other BSs or UEs. BS 110 may perform one or more of any combination of operations or considerations described above to determine null RE positions. BS 110 may place null RE patterns in the set of null RE patterns based at least in part on other null RE patterns already present in the set, null RE patterns that are not in the set, a quantity of null RE patterns in the set, or an age of each null RE pattern among other examples, or a combination thereof.

In some aspects, BS 110 may determine that a number of receive antennas reported by UE 120 satisfies a threshold and may configure a null RE pattern based at least in part on determining that the number of receive antennas reported by UE 120 satisfies the threshold. For example, if UE 120 does not use more than four antennas, BS 110 may not configure or indicate a null RE pattern for UE 120. As another example, if UE 120 does not have more than four antenna ports, BS 110 may not configure or indicate a null RE pattern for UE 120.

In some aspects, BS 110 may determine a null RE pattern or a number of REs included in the null RE pattern based at least in part on a maximum rank configured for PDSCH reception by UE 120, whether UE 120 is operating in a single-user multiple-input-multiple-output (SU-MIMO) mode or a multiple-user multiple-input-multiple-output (MU-MIMO) mode, a precoding resource block group (PRG) configuration, a DMRS bundling configuration, or a combination thereof. Typically, when using MU-MIMO, relative to SU-MIMO, there may be a higher number of null REs that UE 120 will use to correctly estimate an Rnn matrix to be able to cancel or null out interference. In some aspects, the determination of whether UE 120 is operating in an SU-MIMO mode or an MU-MIMO mode may be based at least in part on whether UE 120 may assume that co-scheduled ports are not present on the same resources as the resources scheduled for the PDSCH.

BS 110 may use PRGs for granularity in a frequency domain or to facilitate channel estimation by allowing UE 120 to perform channel estimation across a group of consecutive physical resource blocks (PRBs). This may be referred to as PRB bundling. Performing a joint estimation across a group of PRBs may improve the performance associated with channel estimation. However, enforcing the use of the same transmit precoder across a large quantity of contiguous PRBs may result in lower precoder gains. Therefore, BS 110 may use multiple configurations for PRB bundling. For example, BS 110 may use a narrowband PRG configuration of either 2 or 4 PRBs, or BS 110 may use a wideband PRG configuration in which the same scheduling is applied to all PRBs in a PRB grouping. Accordingly, there is less need for additional null REs as PRGs increase in size. For example, if a PRG is in a wideband PRG configuration, BS 110 may not indicate a null RE pattern, or may indicate a different null RE pattern than if a PRG of 2 or 4 is used.

BS 110 may select a null RE pattern from the set of null RE patterns based at least in part on information about communication conditions, a location of UE 120, a capability of UE 120, information about interference, reference signal measurement information, a history of communication conditions, or a history of selected null RE patterns, among other examples.

In a second operation 410, BS 110 may indicate the null RE pattern in DCI. For example, BS 110 may indicate a value that corresponds to a value or index in a table, array, or other data structure among other examples. In some aspects, the value may correspond to an antenna port field in an antenna port table. The antenna port table may indicate one or more DMRS ports for UE 120 and a number of DMRS code-division multiplexing (CDM) groups without data.

As shown in FIG. 4, BS 110 and UE 120 may be configured such that BS 110 and UE 120 use an antenna port table that has available rows, an additional field, an additional column, or reserved bits among other examples to indicate the null RE pattern. Note that third operation 415 may take place before or during operations 405 and 410, and that BS 110 may configure UE 120 to use the antenna port table at operation 405.

In some aspects, UE 120 may recommend a null RE pattern to BS 110. For example, UE 120 may transmit, to BS 110, an indication of a recommended null RE pattern or a recommended number of REs for the null RE pattern. In some instances or aspects, BS 110 may then indicate the recommended null RE pattern in the DCI based at least in part on the indication of the recommended null RE pattern or the recommended number of REs for the null RE pattern. UE 120 may indicate the recommended null RE pattern or the recommended number of REs for the null RE pattern in at least one of a UE capability report or a channel state information (CSI) report. UE 120 may also receive a CSI report configuration that requests UE 120 to report the recommended null RE pattern or the recommended number of REs for the null RE pattern in the CSI report. UE 120 may use additional bits in uplink DCI to help BS 110 to configure additional null RE patterns.

In some aspects, UE 120 may interpret the null RE pattern indicated in the DCI based at least in part on a rank used by UE 120, a combination of DMRS ports used by UE 120, a maximum rank configured for UE 120, or a combination thereof. The maximum rank configured for UE 120 may be a highest rank UE 120 is configured for among all ranks available to UE 120. Note that a maximum rank for PDSCH may be different than a number of receive antenna ports. In some aspects, "high maximum rank" may refer to a rank that is above 4. In an example, if UE 120 is configured to receive transmissions of up to rank 8 for a PDSCH, then BS 110 may configure a null RE pattern to be denser than if UE 120 is configured to receive transmissions with rank 1 for the PDSCH.

In a third operation 415, UE 120 may perform demodulation interference measurements using the null RE pattern indicated by BS 110. For example, UE 120 may determine interference based at least in part on a measurement of interference at one or more null REs of the null RE pattern. In some aspects, UE 120 may determine that a maximum rank configured for PDSCH reception of UE 120 satisfies a threshold and perform one or more demodulation interference measurements using the null RE pattern indicated in the DCI based at least in part on determining that the maximum rank configured for PDSCH reception of UE 120 satisfies the threshold. In an example, the threshold for a maximum rank may be a rank higher than 4. In another example, the threshold may be a rank of 8.

In a fourth operation 420, UE 120 may demodulate downlink communications from BS 110, such as the downlink communications scheduled using the DCI, based at least in part on the demodulation interference measurements. For example, UE 120 may demodulate a resource block in which interference was measured using a null RE pattern. UE 120 may cancel or account for interference using the demodulation interference measurements from the null RE pattern before extracting signal information by demodulation. By doing so, UE 120 may save processing resources by measuring interference for fewer or no non-null REs.

In some aspects, rather than indicating the null RE pattern in DCI as a value in a table, BS 110 may indicate the null RE pattern in the DCI using a zero power channel state information reference signal (ZP CSI-RS) resource set or another type of zero power downlink reference signal, such as a channel state information interference measurement (CSI-IM) reference signal or another downlink reference signal for interference measurement. Previously, ZP CSI-RS resources may have only been used for rate matching of PDSCH and not for interference measurement. In some aspects, BS 110 and UE 120 may use a ZP CSI-RS resource or ZP CSI-RS resource set for demodulation interference measurement purposes. In some aspects, BS 110 may indicate the null RE pattern as both a value in a table and using a ZP CSI-RS resource set.

Figure 5:
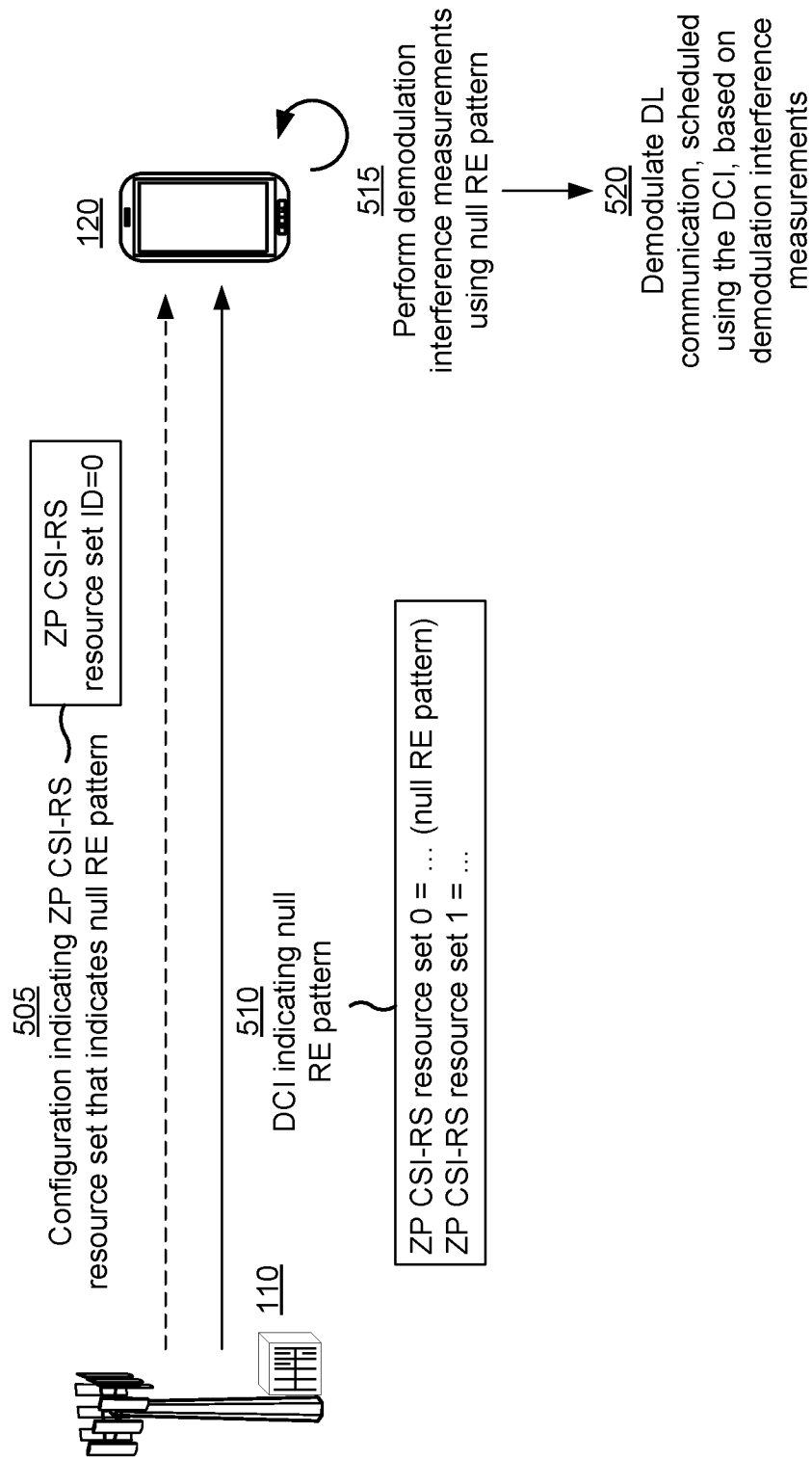
FIG. 5 is a diagram illustrating the use of null resource elements signaled in a resource set of a zero power channel state information reference signal in accordance with various aspects of the present disclosure.

FIG. 5 is a diagram illustrating the use of null REs signaled in a resource set of a ZP CSI-RS in accordance with various aspects of the present disclosure. Base station (BS) 110 may be configured to communicate with user equipment (UE) 120, but UE 120 may be experiencing bursty interference.

In a first operation 505, BS 110 may send, to UE 120, a configuration indicating one or more ZP CSI-RS resource sets that indicate one or more respective null RE patterns. For example, a ZP CSI-RS resource set ID of 0 may correspond to a particular null RE pattern of a set of null RE patterns. Although ZP CSI-RSs are used as an example, another type of downlink reference signal may be used, such as a CSI-IM reference signal.

In a second operation 510, BS 110 may indicate a null RE pattern using a ZP CSI-RS resource set. For example, a first ZP CSI-RS resource set value of 0 may indicate a first null RE pattern, and a second ZP CSI-RS resource set value of 1 may indicate a second null RE pattern among other examples. In some aspects, BS 110 and UE 120 may be configured to use additional bits to indicate null RE patterns using ZP CSI-RS resource sets. Note that BS 110 may configure, select, or indicate null RE patterns using one or more of any combination of considerations or options discussed above in reference to FIG. 4.

In a third operation 515, UE 120 may perform demodulation interference measurements using the null RE pattern. For example, UE 120 may determine interference based at least in part on a measurement of interference at one or more null REs of the null RE pattern, in a manner similar to that described above with reference to FIG. 4. In some aspects, UE 120 may determine that a maximum rank configured for PDSCH reception of UE 120 satisfies a threshold and perform one or more demodulation interference measurements using the null RE pattern based at least in part on determining that a maximum rank configured for PDSCH reception of UE 120 satisfies the threshold. In an example, the threshold for a maximum rank may be a rank higher than 4. In another example, the threshold may be a rank of 8.

In a fourth operation 520, UE 120 may demodulate a downlink communication, scheduled using the DCI, based at least in part on demodulation interference measurements. For example, UE 120 may demodulate a resource block in which interference was measured using a null RE pattern, in a manner similar to that described above with reference to FIG. 4.

Figure 6:
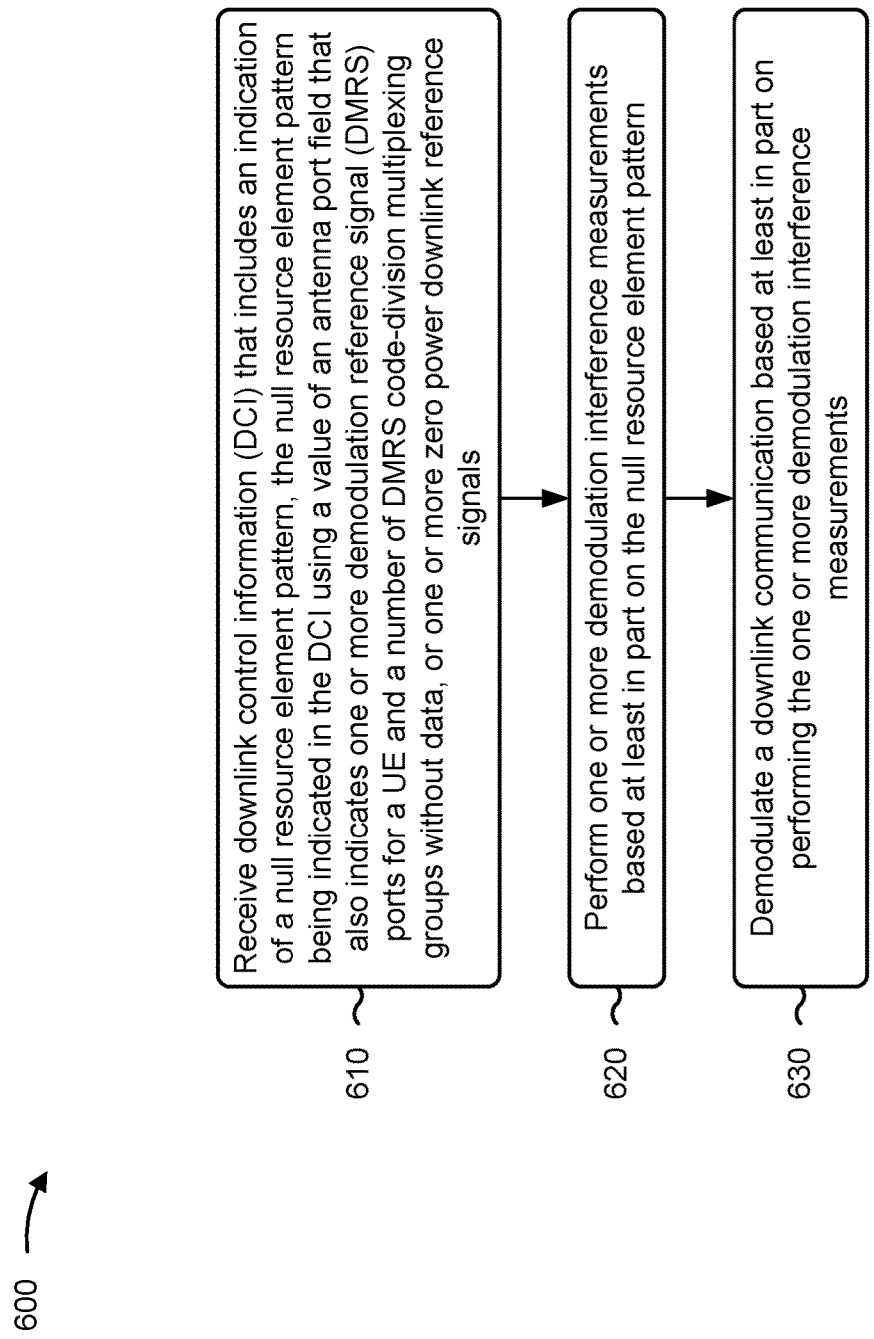
FIG. 6 is a flowchart illustrating an example process performed, for example, by a UE in accordance with various aspects of the present disclosure.

FIG. 6 is a flowchart illustrating an example process 600 performed, for example, by a UE in accordance with various aspects of the present disclosure. Example process 600 is an example where the UE (for example, UE 120) performs operations associated with using null resource elements for demodulation interference estimation.

As shown in FIG. 6, in some aspects, process 600 may include receiving DCI that includes an indication of a null resource element pattern, the null resource element pattern being indicated in the DCI using: a value of an antenna port field that also indicates one or more DMRS ports for the UE and a number of DMRS code-division multiplexing groups without data, or one or more zero power downlink reference signals (block 610). For example, the UE (such as by using reception component 1002, depicted in FIG. 10) may receive DCI that includes an indication of a null resource element pattern, the null resource element pattern being indicated in the DCI using: a value of an antenna port field that also indicates one or more DMRS ports for the UE and a number of DMRS code-division multiplexing groups without data, or one or more zero power downlink reference signals, as described above.

As further shown in FIG. 6, in some aspects, process 600 may include performing one or more demodulation interference measurements based at least in part on the null resource element pattern (block 620). For example, the UE (such as by using communication manager 1004 or interference cancellation component 1010, depicted in FIG. 10) may perform one or more demodulation interference measurements based at least in part on the null resource element pattern, as described above.

As further shown in FIG. 6, in some aspects, process 600 may include demodulating a downlink communication based at least in part on performing the one or more demodulation interference measurements (block 630). For example, the UE (such as by using communication manager 1004 or demodulation component 1012, depicted in FIG. 10) may demodulate a downlink communication based at least in part on performing the one or more demodulation interference measurements, as described above.

Process 600 may include additional aspects, such as any single aspect or any combination of aspects described below or in connection with one or more other processes described elsewhere herein.

In a first additional aspect, process 600 includes receiving a configuration that indicates a set of null resource element patterns, wherein the null resource element pattern indicated in the DCI is selected from the set of null resource element patterns.

In a second additional aspect, alone or in combination with the first aspect, the configuration indicates different sets of null resource element patterns for at least one of different ranks or different combinations of DMRS ports.

In a third additional aspect, alone or in combination with one or more of the first and second aspects, process 600 includes interpreting the null resource element pattern indicated in the DCI based at least in part on a rank used by the UE, a combination of DMRS ports used by the UE, a maximum rank configured for the UE, or a combination thereof.

In a fourth additional aspect, alone or in combination with one or more of the first through third aspects, process 600 includes determining that a maximum rank configured for PDSCH reception of the UE satisfies a threshold, and performing the one or more demodulation interference measurements using the null resource element pattern based at least in part on determining that the maximum rank configured for PDSCH reception of the UE satisfies the threshold.

In a fifth additional aspect, alone or in combination with one or more of the first through fourth aspects, at least one of the null resource element pattern or a number of resource elements included in the null resource element pattern depends on at least one of a maximum rank configured for PDSCH reception of the UE, whether the UE is operating in a SU-MIMO mode or an MU-MIMO mode, a precoding resource block group configuration, a DMRS bundling configuration, or a combination thereof.

In a sixth additional aspect, alone or in combination with one or more of the first through fifth aspects, the one or more zero power downlink reference signals include one or more zero power channel state information reference signals.

In a seventh additional aspect, alone or in combination with one or more of the first through sixth aspects, the one or more zero power downlink reference signals include one or more channel state information interference measurement reference signals or one or more downlink reference signals for interference measurement.

In an eighth additional aspect, alone or in combination with one or more of the first through seventh aspects, process 600 includes transmitting, to a base station, an indication of a recommended null resource element pattern or a recommended number of resource elements for the null resource element pattern.

In a ninth additional aspect, alone or in combination with one or more of the first through eighth aspects, the null resource element pattern indicated in the DCI is based at least in part on the indication of the recommended null resource element pattern or the recommended number of resource elements for the null resource element pattern.

In a tenth additional aspect, alone or in combination with one or more of the first through ninth aspects, process 600 includes indicating the recommended null resource element pattern or the recommended number of resource elements for the null resource element pattern in at least one of a UE capability report or a CSI report.

In an eleventh additional aspect, alone or in combination with one or more of the first through tenth aspects, process 600 includes receiving a CSI report configuration that requests the UE to report the recommended null resource element pattern or the recommended number of resource elements for the null resource element pattern in the CSI report.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
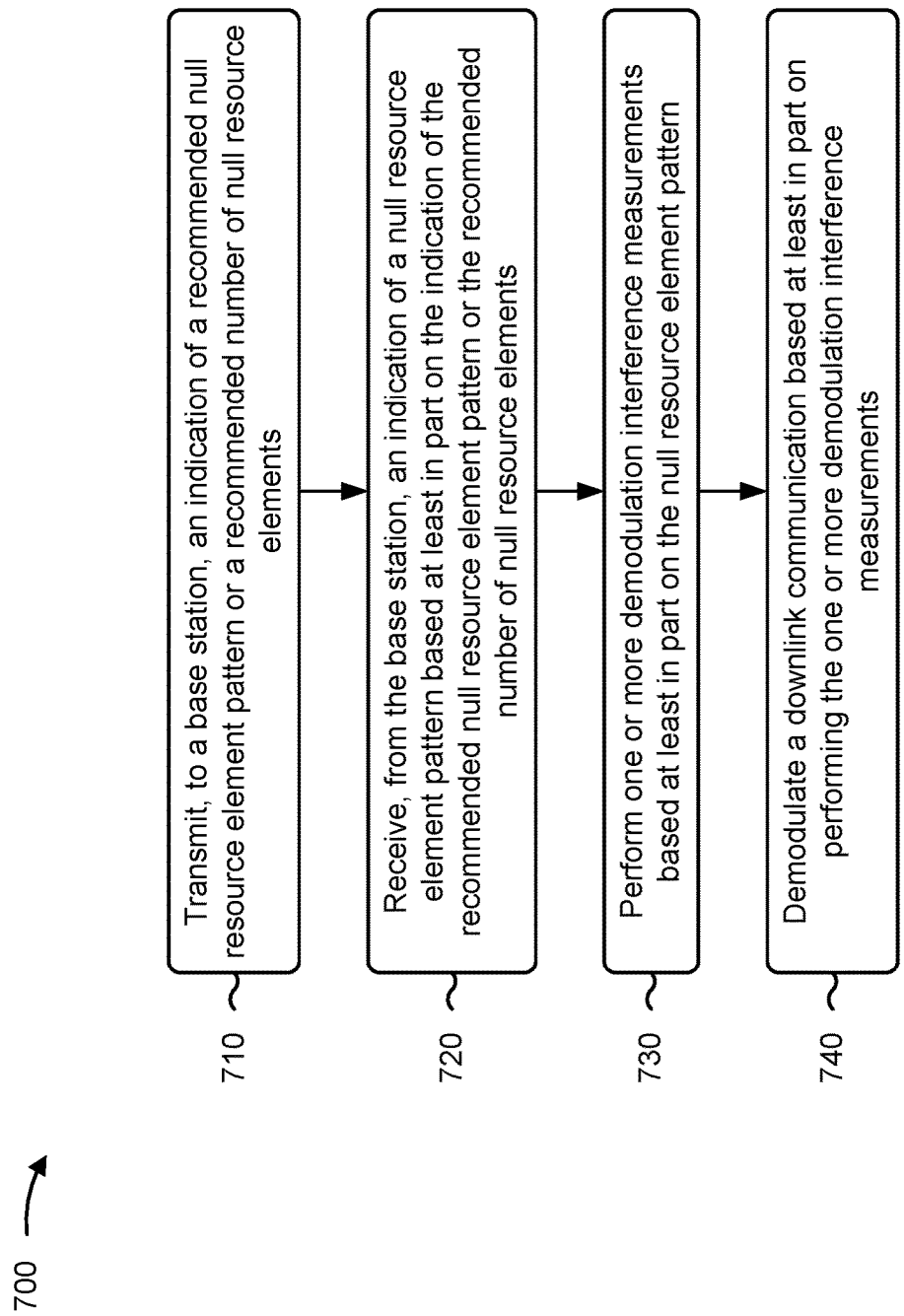
FIG. 7 is a flowchart illustrating an example process performed, for example, by a UE in accordance with various aspects of the present disclosure.

FIG. 7 is a flowchart illustrating an example process 700 performed, for example, by a UE in accordance with various aspects of the present disclosure. Example process 700 is an example where the UE (for example, UE 120) performs operations associated with using null resource elements for demodulation interference estimation.

As shown in FIG. 7, in some aspects, process 700 may include transmitting, to a base station, an indication of a recommended null resource element pattern or a recommended number of null resource elements (block 710). For example, the UE (such as by using transmission component 1106, depicted in FIG. 11) may transmit, to a base station, an indication of a recommended null resource element pattern or a recommended number of null resource elements, as described above.

As further shown in FIG. 7, in some aspects, process 700 may include receiving, from the base station, an indication of a null resource element pattern based at least in part on the indication of the recommended null resource element pattern or the recommended number of null resource elements (block 720). For example, the UE (such as by using reception component 1102, depicted in FIG. 11) may receive, from the base station, an indication of a null resource element pattern based at least in part on the indication of the recommended null resource element pattern or the recommended number of null resource elements, as described above.

As further shown in FIG. 7, in some aspects, process 700 may include performing one or more demodulation interference measurements based at least in part on the null resource element pattern (block 730). For example, the UE (such as by using communication manager 1104 or interference cancellation component 1110, depicted in FIG. 11) may perform one or more demodulation interference measurements based at least in part on the null resource element pattern, as described above.

As further shown in FIG. 7, in some aspects, process 700 may include demodulating a downlink communication based at least in part on performing the one or more demodulation interference measurements (block 740). For example, the UE (such as by using communication manager 1104 or transmission component 1106, depicted in FIG. 11) may demodulate a downlink communication based at least in part on performing the one or more demodulation interference measurements, as described above.

Process 700 may include additional aspects, such as any single aspect or any combination of aspects described below or in connection with one or more other processes described elsewhere herein.

In a first additional aspect, the indication of the null resource element pattern is included in DCI, and wherein the null resource element pattern is indicated in the DCI using a value of an antenna port field that also indicates one or more DMRS ports for the UE and a number of DMRS code-division multiplexing groups without data, or one or more zero power downlink reference signals.

In a second additional aspect, alone or in combination with the first aspect, the indication of the recommended null resource element pattern or the recommended number of null resource elements is included in at least one of a UE capability report or a CSI report.

In a third additional aspect, alone or in combination with one or more of the first and second aspects, process 700 includes receiving a CSI report configuration that requests the UE to report the recommended null resource element pattern or the recommended number of null resource elements in the CSI report.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
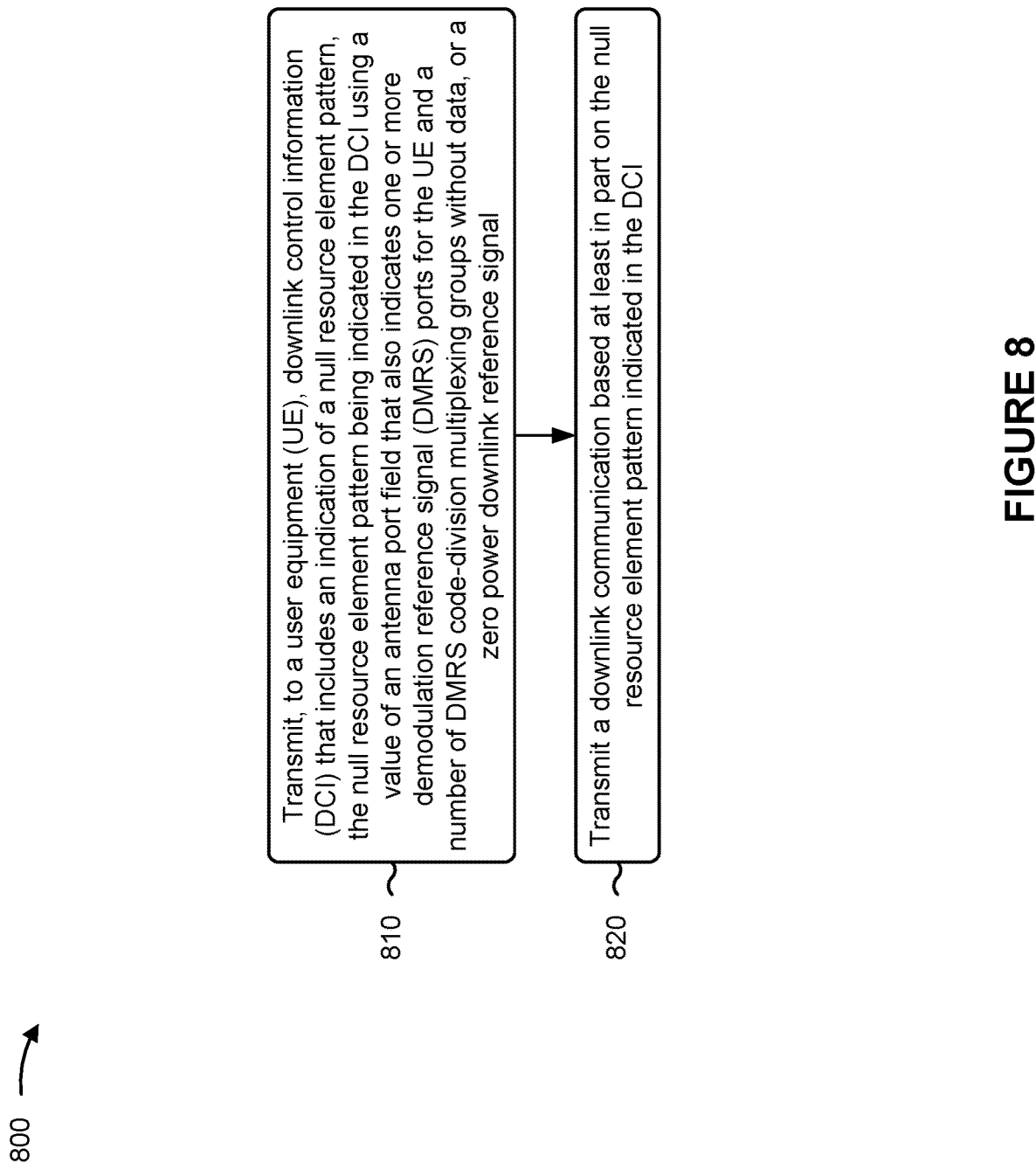
FIG. 8 is a flowchart illustrating an example process performed, for example, by a base station in accordance with various aspects of the present disclosure.

FIG. 8 is a flowchart illustrating an example process 800 performed, for example, by a base station in accordance with various aspects of the present disclosure. Example process 800 is an example where the base station (for example, base station 110) performs operations associated with using null resource elements for demodulation interference estimation.

As shown in FIG. 8, in some aspects, process 800 may include transmitting, to a UE, DCI that includes an indication of a null resource element pattern, the null resource element pattern being indicated in the DCI using: a value of an antenna port field that also indicates one or more DMRS ports for the UE and a number of DMRS code-division multiplexing groups without data, or a zero power downlink reference signal (block 810). For example, the base station (such as by using transmission component 1206, depicted in FIG. 12) may transmit, to a UE, DCI that includes an indication of a null resource element pattern, the null resource element pattern being indicated in the DCI using: a value of an antenna port field that also indicates one or more DMRS ports for the UE and a number of DMRS code-division multiplexing groups without data, or a zero power downlink reference signal, as described above.

As further shown in FIG. 8, in some aspects, process 800 may include transmitting a downlink communication based at least in part on the null resource element pattern indicated in the DCI (block 820). For example, the base station (such as by using transmission component 1206, depicted in FIG. 12) may transmit a downlink communication based at least in part on the null resource element pattern indicated in the DCI, as described above.

Process 800 may include additional aspects, such as any single aspect or any combination of aspects described below or in connection with one or more other processes described elsewhere herein.

In a first additional aspect, process 800 includes transmitting a configuration that indicates a set of null resource element patterns and selecting the null resource element pattern to be indicated in the DCI from the set of null resource element patterns.

In a second additional aspect, alone or in combination with the first aspect, the configuration indicates different sets of null resource element patterns for at least one of different ranks or different combinations of DMRS ports.

In a third additional aspect, alone or in combination with one or more of the first and second aspects, process 800 includes determining that a number of receive antennas reported by the UE satisfies a threshold, and indicating a null resource element pattern based at least in part on determining that the number of receive antennas reported by the UE satisfies the threshold.

In a fourth additional aspect, alone or in combination with one or more of the first through third aspects, at least one of the null resource element pattern or a number of resource elements included in the null resource element pattern depends on at least one of a maximum rank configured for PDSCH reception of the UE, whether the UE is operating in a SU-MIMO mode or an MU-MIMO mode, a precoding resource block group configuration, a DMRS bundling configuration, or a combination thereof.

In a fifth additional aspect, alone or in combination with one or more of the first through fourth aspects, the one or more zero power downlink reference signals include one or more zero power channel state information reference signals.

In a sixth additional aspect, alone or in combination with one or more of the first through fifth aspects, the one or more zero power downlink reference signals include one or more channel state information interference measurement reference signals or one or more downlink reference signals for interference measurement.

In a seventh additional aspect, alone or in combination with one or more of the first through sixth aspects, process 800 includes receiving, from the UE, an indication of a recommended null resource element pattern or a recommended number of resource elements for the null resource element pattern.

In an eighth additional aspect, alone or in combination with one or more of the first through seventh aspects, process 800 includes determining whether to select the null resource element pattern based at least in part on the recommended null resource element pattern or the recommended number of resource elements for the null resource element pattern.

In a ninth additional aspect, alone or in combination with one or more of the first through eighth aspects, receiving the indication of the recommended null resource element pattern or the recommended number of resource elements for the null resource element pattern includes receiving the indication of the recommended null resource element pattern or the recommended number of resource elements for the null resource element pattern in at least one of a UE capability report or a CSI report.

In a tenth additional aspect, alone or in combination with one or more of the first through ninth aspects, process 800 includes transmitting a CSI report configuration that requests the UE to report the recommended null resource element pattern or the recommended number of resource elements for the null resource element pattern in the CSI report.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
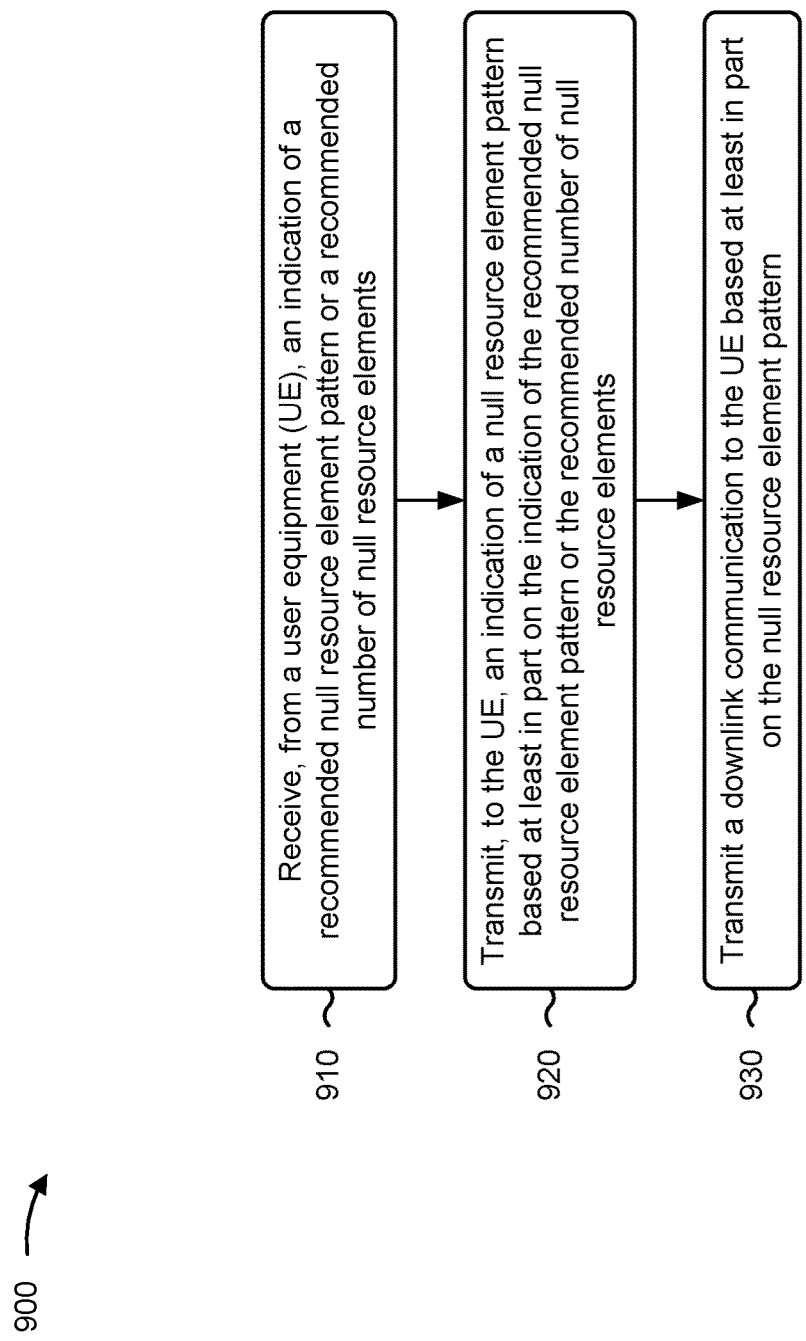
FIG. 9 is a flowchart illustrating an example process performed, for example, by a base station in accordance with various aspects of the present disclosure.

FIG. 9 is a flowchart illustrating an example process 900 performed, for example, by a base station in accordance with various aspects of the present disclosure. Example process 900 is an example where the base station (for example, base station 110) performs operations associated with using null resource elements for demodulation interference estimation.

As shown in FIG. 9, in some aspects, process 900 may include receiving, from a UE, an indication of a recommended null resource element pattern or a recommended number of null resource elements (block 910). For example, the base station (such as by using reception component 1302, depicted in FIG. 13) may receive, from a UE, an indication of a recommended null resource element pattern or a recommended number of null resource elements, as described above.

As further shown in FIG. 9, in some aspects, process 900 may include transmitting, to the UE, an indication of a null resource element pattern based at least in part on the indication of the recommended null resource element pattern or the recommended number of null resource elements (block 920). For example, the base station (such as by using transmission component 1306, depicted in FIG. 13) may transmit, to the UE, an indication of a null resource element pattern based at least in part on the indication of the recommended null resource element pattern or the recommended number of null resource elements, as described above.

As further shown in FIG. 9, in some aspects, process 900 may include transmitting a downlink communication to the UE based at least in part on the null resource element pattern (block 930). For example, the base station (such as by using transmission component 1306, depicted in FIG. 13) may transmit a downlink communication to the UE based at least in part on the null resource element pattern, as described above.

Process 900 may include additional aspects, such as any single aspect or any combination of aspects described below or in connection with one or more other processes described elsewhere herein.

In a first additional aspect, the indication of the null resource element pattern is included in DCI, and wherein the null resource element pattern is indicated in the DCI using a value of an antenna port field that also indicates one or more DMRS ports for the UE and a number of DMRS code-division multiplexing groups without data, or one or more zero power downlink reference signals.

In a second additional aspect, alone or in combination with the first aspect, the indication of the recommended null resource element pattern or the recommended number of null resource elements is included in at least one of a UE capability report or a CSI report.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
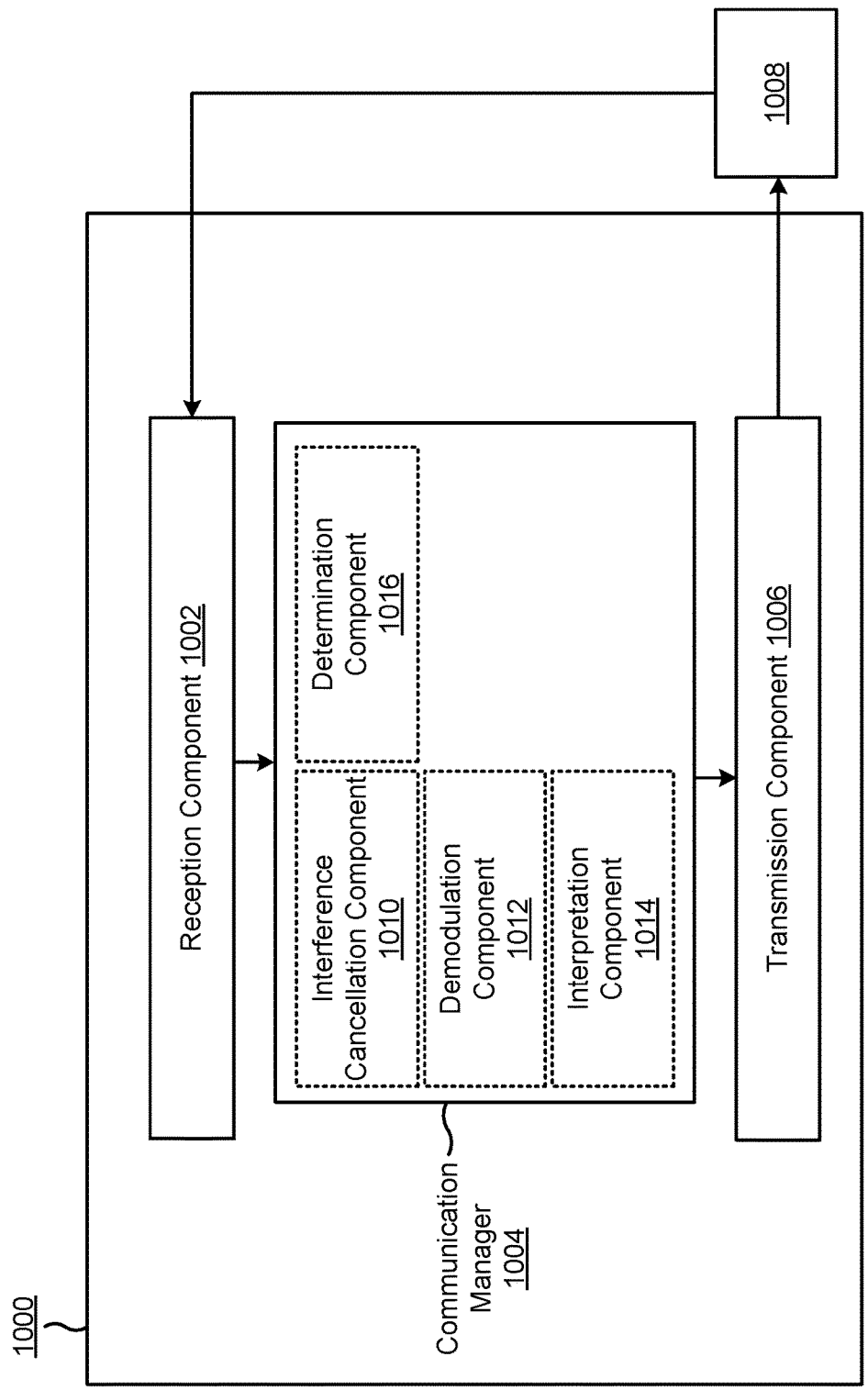
FIGS. 10-13 are block diagrams of example apparatuses for wireless communication in accordance with various aspects of the present disclosure.

FIG. 10 is a block diagram of an example apparatus 1000 for wireless communication in accordance with various aspects of the present disclosure. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 4-5. Additionally or alternatively, the apparatus 1000 may be configured to perform one or more processes described herein, such as process 600 of FIG. 6, process 700 of FIG. 7, or a combination thereof. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be co-located with the reception component 1002 in a transceiver.

The communication manager 1004 may receive or may cause the reception component 1002 to receive DCI that includes an indication of a null resource element pattern. The null resource element pattern may be indicated in the DCI using: a value of an antenna port field that also indicates one or more DMRS ports for the UE and a number of DMRS code-division multiplexing groups without data, or one or more zero power downlink reference signals. The communication manager 1004 may perform one or more demodulation interference measurements based at least in part on the null resource element pattern. The communication manager 1004 may demodulate a downlink communication based at least in part on performing the one or more demodulation interference measurements. In some aspects, the communication manager 1004 may perform one or more operations described below as being performed by one or more components included in the communication manager 1004. In some aspects, the communication manager 1004 may include a controller/processor, a memory, or a combination thereof, of the UE described above in connection with FIG. 2.

In some aspects, the communication manager 1004 may include a set of components, such as an interference cancellation component 1010, a demodulation component 1012, an interpretation component 1014, a determination component 1016, or a combination thereof. Alternatively, the set of components may be separate and distinct from the communication manager 1004. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 1002 may receive DCI that includes an indication of a null resource element pattern. The null resource element pattern may be indicated in the DCI using: a value of an antenna port field that also indicates one or more DMRS ports for the UE and a number of DMRS code-division multiplexing groups without data, or one or more zero power downlink reference signals. The interference cancellation component 1010 may perform one or more demodulation interference measurements based at least in part on the null resource element pattern. The demodulation component 1012 may demodulate a downlink communication based at least in part on performing the one or more demodulation interference measurements.

The reception component 1002 may receive a configuration that indicates a set of null resource element patterns, wherein the null resource element pattern indicated in the DCI is selected from the set of null resource element patterns. The interpretation component 1014 may interpret the null resource element pattern indicated in the DCI based at least in part on a rank used by the UE, a combination of DMRS ports used by the UE, a maximum rank configured for the UE, or a combination thereof. The determination component 1016 may determine that a maximum rank configured for PDSCH reception of the UE satisfies a threshold. The interference cancellation component 1010 may perform the one or more demodulation interference measurements using the null resource element pattern based at least in part on determining that the maximum rank configured for PDSCH reception of the UE satisfies the threshold. The transmission component 1006 may transmit, to a base station, an indication of a recommended null resource element pattern or a recommended number of resource elements for the null resource element pattern. The transmission component 1006 may indicate the recommended null resource element pattern or the recommended number of resource elements for the null resource element pattern in at least one of a UE capability report or a CSI report. The reception component 1002 may receive a CSI report configuration that requests the UE to report the recommended null resource element pattern or the recommended number of resource elements for the null resource element pattern in the CSI report.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
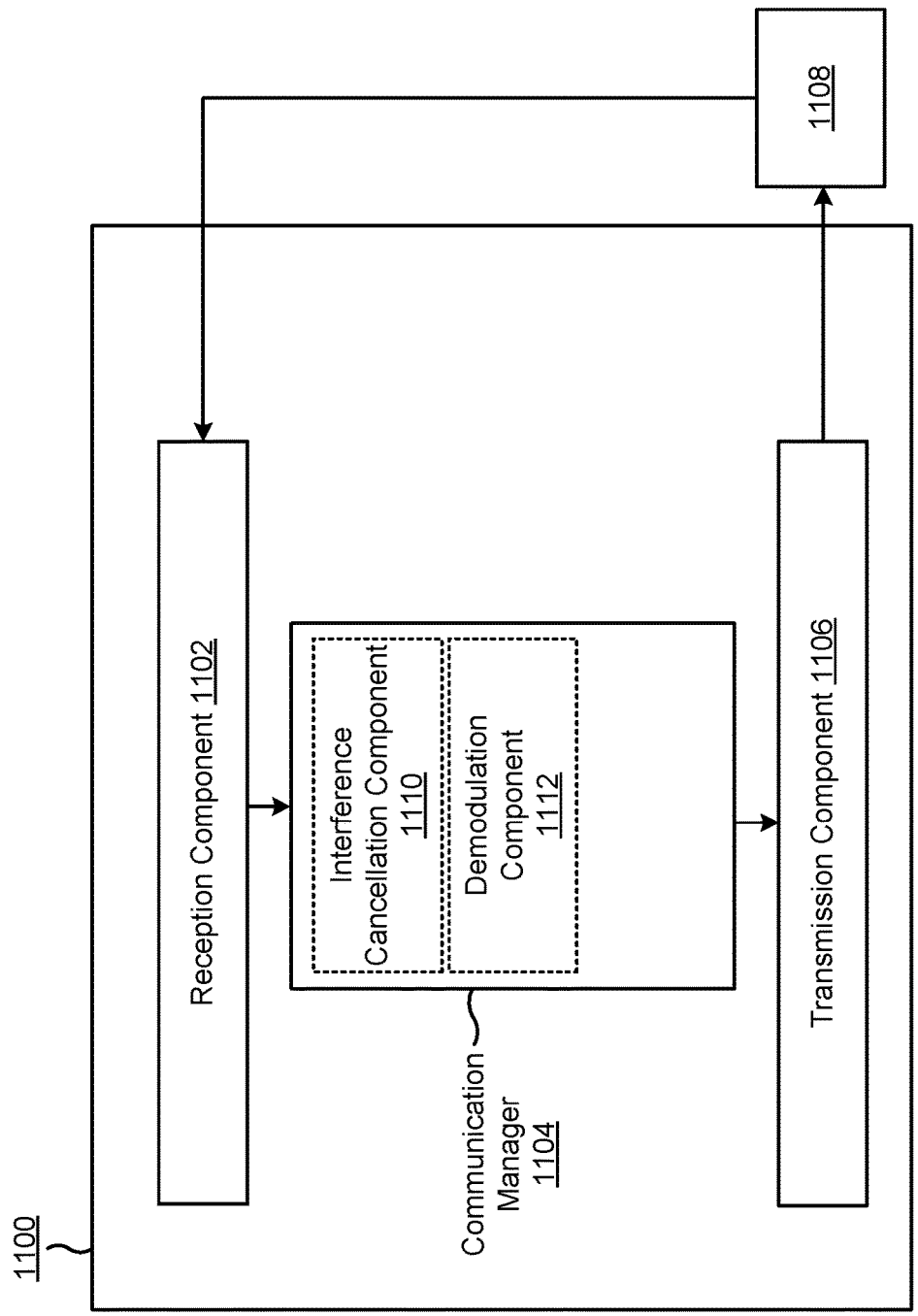

FIG. 11 is a block diagram of an example apparatus 1100 for wireless communication in accordance with various aspects of the present disclosure. The apparatus 1100 may be a UE, or a UE may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 4-5. Additionally or alternatively, the apparatus 1100 may be configured to perform one or more processes described herein, such as process 600 of FIG. 6, process 700 of FIG. 7, or a combination thereof. In some aspects, the apparatus 1100 may include one or more components of the UE described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE described above in connection with FIG.

2. In some aspects, the transmission component 1106 may be co-located with the reception component 1102 in a transceiver.

The communication manager 1104 may transmit or may cause the transmission component 1106 to transmit, to a base station, an indication of a recommended null resource element pattern or a recommended number of null resource elements. The communication manager 1104 may receive or may cause the reception component 1102 to receive, from the base station, an indication of a null resource element pattern based at least in part on the indication of the recommended null resource element pattern or the recommended number of null resource elements. The communication manager 1104 may perform one or more demodulation interference measurements based at least in part on the null resource element pattern. The communication manager 1104 may demodulate a downlink communication based at least in part on performing the one or more demodulation interference measurements. The communication manager 1104 may receive or may cause the reception component 1102 to receive a CSI report configuration that requests the UE to report the recommended null resource element pattern or the recommended number of null resource elements in the CSI report. In some aspects, the communication manager 1104 may include a controller/processor, a memory, or a combination thereof, of the UE described above in connection with FIG. 2.

In some aspects, the communication manager 1104 may include a set of components, such as an interference cancellation component 1110, a demodulation component 1112, or a combination thereof. Alternatively, the set of components may be separate and distinct from the communication manager 1104. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1106 may transmit, to a base station, an indication of a recommended null resource element pattern or a recommended number of null resource elements. The reception component 1102 may receive, from the base station, an indication of a null resource element pattern based at least in part on the indication of the recommended null resource element pattern or the recommended number of null resource elements. The interference cancellation component 1110 may perform one or more demodulation interference measurements based at least in part on the null resource element pattern. The demodulation component 1112 may demodulate a downlink communication based at least in part on performing the one or more demodulation interference measurements. The reception component 1102 may receive a CSI report configuration that requests the UE to report the recommended null resource element pattern or the recommended number of null resource elements in the CSI report.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
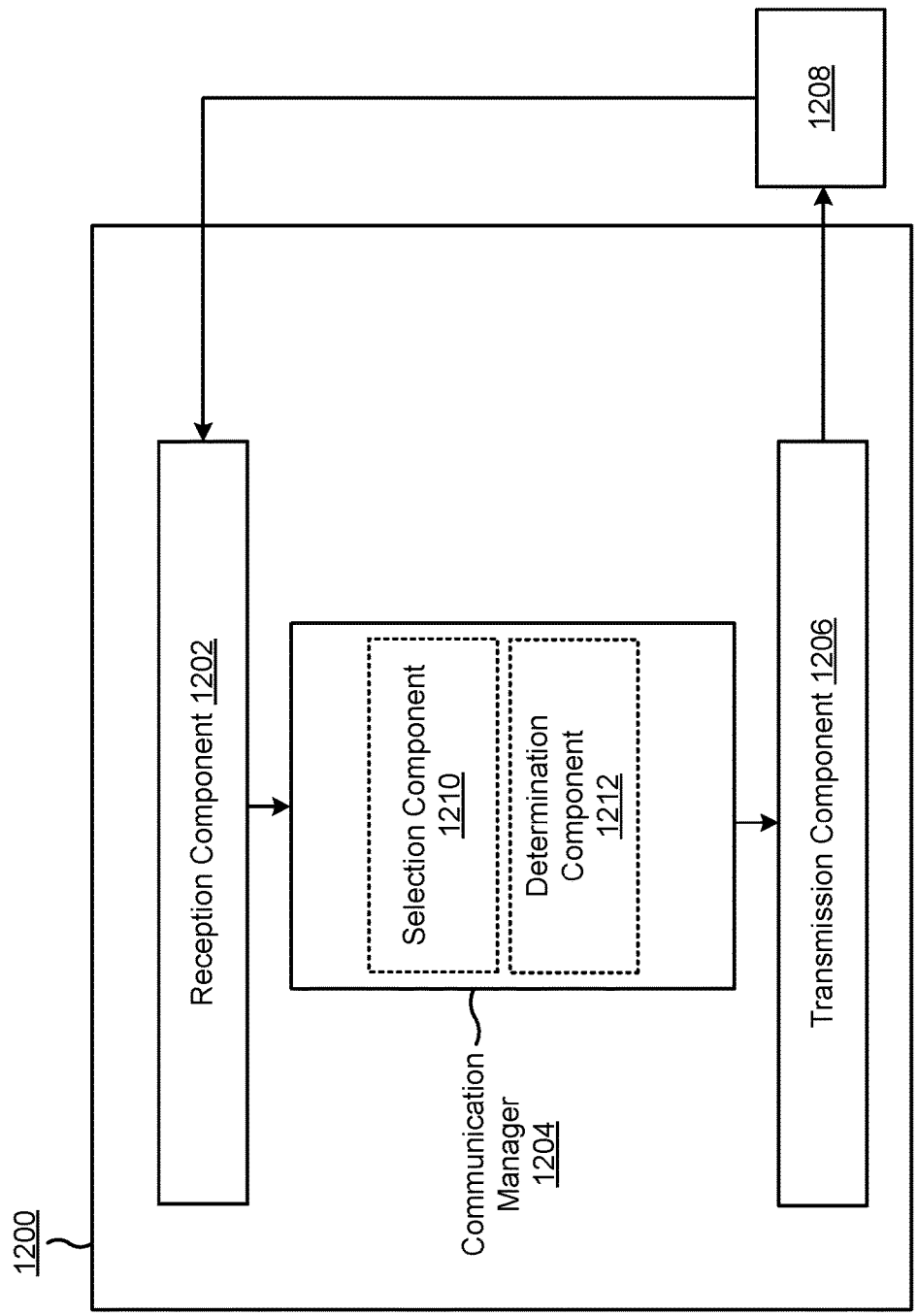

FIG. 12 is a block diagram of an example apparatus 1200 for wireless communication in accordance with various aspects of the present disclosure. The apparatus 1200 may be a base station, or a base station may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 4-5. Additionally or alternatively, the apparatus 1200 may be configured to perform one or more processes described herein, such as process 800 of FIG. 8, process 900 of FIG. 9, or a combination thereof. In some aspects, the apparatus 1200 may include one or more components of the base station described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the base station described above in connection with FIG. 2. In some aspects, the transmission component 1206 may be co-located with the reception component 1202 in a transceiver.

The communication manager 1204 may transmit or may cause the transmission component 1206 to transmit, to a UE, DCI that includes an indication of a null resource element pattern. The null resource element pattern may be indicated in the DCI using: a value of an antenna port field that also indicates one or more DMRS ports for the UE and a number of DMRS code-division multiplexing groups without data, or a zero power downlink reference signal. The communication manager 1204 may transmit or may cause the transmission component 1206 to transmit a downlink communication based at least in part on the null resource element pattern indicated in the DCI. The communication manager 1204 may transmit or may cause the transmission component 1206 to transmit a configuration that indicates a set of null resource element patterns. The communication manager 1204 may select the null resource element pattern to be indicated in the DCI from the set of null resource element patterns. The communication manager 1204 may determine that a number of receive antennas reported by the UE satisfies a threshold. The communication manager 1204 may indicate or may cause the transmission component 1206 to indicate a null resource element pattern based at least in part on determining that the number of receive antennas reported by the UE satisfies the threshold. The communication manager 1204 may receive or may cause the reception component 1202 to receive, from the UE, an indication of a recommended null resource element pattern or a recommended number of resource elements for the null resource element pattern. The communication manager 1204 may determine whether to select the null resource element pattern based at least in part on the recommended null resource element pattern or the recommended number of resource elements for the null resource element pattern. The communication manager 1204 may transmit or may cause the transmission component 1206 to transmit a CSI report configuration that requests the UE to report the recommended null resource element pattern or the recommended number of resource elements for the null resource element pattern in the CSI report. In some aspects, the communication manager 1204 may include a controller/processor, a memory, a scheduler, a communication unit, or a combination thereof, of the base station described above in connection with FIG. 2.

In some aspects, the communication manager 1204 may include a set of components, such as a selection component 1210, a determination component 1212, or a combination thereof. Alternatively, the set of components may be separate and distinct from the communication manager 1204. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1206 may transmit, to a UE, DCI that includes an indication of a null resource element pattern. The null resource element pattern may be indicated in the DCI using: a value of an antenna port field that also indicates one or more DMRS ports for the UE and a number of DMRS code-division multiplexing groups without data, or a zero power downlink reference signal. The transmission component 1206 may transmit a downlink communication based at least in part on the null resource element pattern indicated in the DCI. The transmission component 1206 may transmit a configuration that indicates a set of null resource element patterns. The selection component 1210 may select the null resource element pattern to be indicated in the DCI from the set of null resource element patterns. The determination component 1212 may determine that a number of receive antennas reported by the UE satisfies a threshold. The transmission component 1206 may indicate a null resource element pattern based at least in part on determining that the number of receive antennas reported by the UE satisfies the threshold. The reception component 1202 may receive, from the UE, an indication of a recommended null resource element pattern or a recommended number of resource elements for the null resource element pattern. The determination component 1212 may determine whether to select the null resource element pattern based at least in part on the recommended null resource element pattern or the recommended number of resource elements for the null resource element pattern. The transmission component 1206 may transmit a CSI report configuration that requests the UE to report the recommended null resource element pattern or the recommended number of resource elements for the null resource element pattern in the CSI report.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
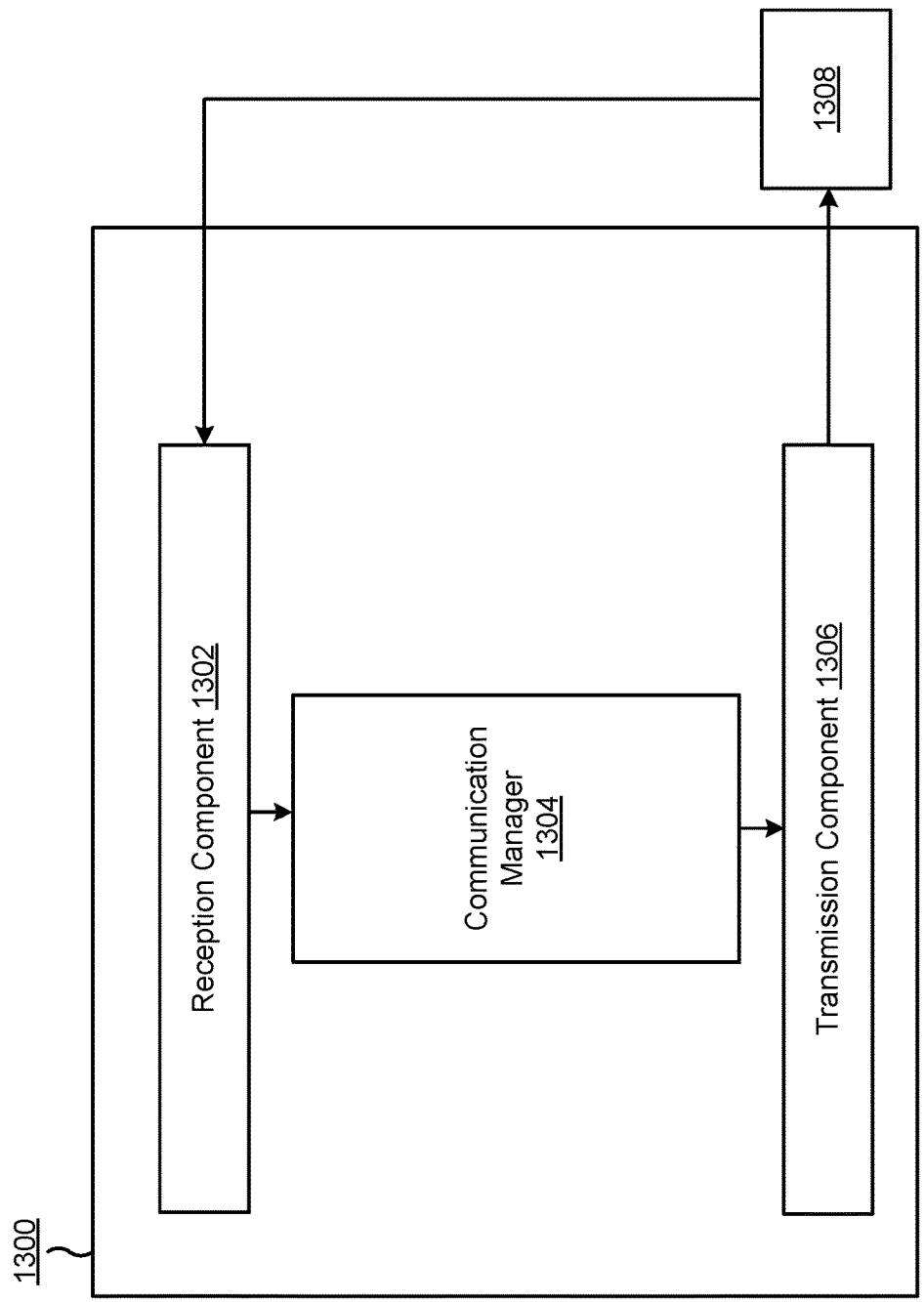

FIG. 13 is a block diagram of an example apparatus 1300 for wireless communication in accordance with various aspects of the present disclosure. The apparatus 1300 may be a base station, or a base station may include the apparatus 1300. In some aspects, the apparatus 1300 includes a reception component 1302, a communication manager 1304, and a transmission component 1306, which may be in communication with one another (for example, via one or more buses). As shown, the apparatus 1300 may communicate with another apparatus 1308 (such as a UE, a base station, or another wireless communication device) using the reception component 1302 and the transmission component 1306.

In some aspects, the apparatus 1300 may be configured to perform one or more operations described herein in connection with FIGS. 4-5. Additionally or alternatively, the apparatus 1300 may be configured to perform one or more processes described herein, such as process 800 of FIG. 8, process 900 of FIG. 9, or a combination thereof. In some aspects, the apparatus 1300 may include one or more components of the base station described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-todigital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the base station described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the base station described above in connection with FIG. 2. In some aspects, the transmission component 1306 may be co-located with the reception component 1302 in a transceiver.

The communication manager 1304 may receive or may cause the reception component 1302 to receive, from a UE, an indication of a recommended null resource element pattern or a recommended number of null resource elements. The communication manager 1304 may transmit or may cause the transmission component 1306 to transmit, to the UE, an indication of a null resource element pattern based at least in part on the indication of the recommended null resource element pattern or the recommended number of null resource elements. The communication manager 1304 may transmit or may cause the transmission component 1306 to transmit a downlink communication to the UE based at least in part on the null resource element pattern. In some aspects, the communication manager 1304 may include a controller/processor, a memory, a scheduler, a communication unit, or a combination thereof, of the base station described above in connection with FIG. 2.

In some aspects, the communication manager 1304 may include a set of components, such as one or more components of the communication manager 1204 described above in connection with FIG. 12. Alternatively, the set of components may be separate and distinct from the communication manager 1304. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code. Software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, among other examples, or combinations thereof), and may be used interchangeably with "one or more." Where only one item is intended, the phrase "only one" or similar language is used. Also, as used herein, the terms "has," "have," "having," among other examples, or combinations thereof are intended to be open-ended terms. Further, the phrase "based on" is intended to mean "based, at least in part, on" unless explicitly stated otherwise.

What is claimed is:

1. A method of wireless communication performed at a user equipment (UE), comprising:
transmitting a first indication indicating a recommended null resource element pattern or a recommended quantity of resource elements for a null resource element pattern in at least one of a UE capability report or a channel state information (CSI) report;
receiving downlink control information (DCI) that includes a second indication indicating a particular null resource element pattern of a set of null resource element patterns,
at least one of the recommended null resource element pattern or the recommended quantity of resource elements included in the null resource element pattern depending on at least one of:
a maximum rank configured for physical downlink shared channel (PDSCH) reception of the UE, or
a precoding resource block group configuration;
performing one or more demodulation interference measurements using the particular null resource element pattern; and
demodulating a downlink communication responsive at least in part to performing the one or more demodulation interference measurements.

2. The method of claim 1, further comprising receiving a configuration that indicates the set of null resource element patterns, the particular null resource element pattern indicated in the DCI being selected from the set of null resource element patterns.

3. The method of claim 2, wherein the configuration indicates different sets of null resource element patterns for at least one of different ranks or different combinations of demodulation reference signal (DMRS) ports.

4. The method of claim 1, further comprising interpreting the particular null resource element pattern indicated in the DCI in accordance with a rank used by the UE, a combination of demodulation reference signal (DMRS) ports used by the UE, a maximum rank configured for the UE, or a combination thereof.

5. The method of claim 1, wherein performing the one or more demodulation interference measurements using the particular null resource element pattern is responsive at least in part to the maximum rank configured for PDSCH reception of the UE satisfying a threshold.

6. The method of claim 1, wherein the particular null resource element pattern is indicated in the DCI using a value of a zero power downlink reference signal resource set, one or more zero power downlink reference signals including one or more zero power channel state information reference signals.

7. The method of claim 1, wherein the particular null resource element pattern is indicated in the DCI using a value of a zero power downlink reference signal resource set, one or more zero power downlink reference signals including one or more channel state information interference measurement reference signals or one or more downlink reference signals for interference measurement.

8. The method of claim 1, wherein the particular null resource element pattern indicated in the DCI is responsive at least in part to the first indication.

9. The method of claim 1, further comprising receiving a CSI report configuration that requests the UE to report the recommended null resource element pattern or the recommended quantity of resource elements for the null resource element pattern in the CSI report.

10. The method of claim 1, wherein the particular null resource element pattern is indicated in the DCI using:
a value of an antenna port field that also indicates one or more demodulation reference signal (DMRS) ports for the UE and a quantity of DMRS code-division multiplexing groups without data, or
a value of a zero power downlink reference signal resource set.

11. A method of wireless communication performed at a user equipment (UE), comprising:
transmitting, to a base station, an indication of a recommended null resource element pattern in at least one of a UE capability report or a channel state information (CSI) report,
the indication of the recommended null resource element pattern indicating an arrangement of null resource elements in time and frequency within a resource block;
receiving, from the base station, an indication of a null resource element pattern of a set of null resource element patterns in accordance with the indication of the recommended null resource element pattern;
performing one or more demodulation interference measurements using the null resource element pattern; and
demodulating a downlink communication responsive at least in part to performing the one or more demodulation interference measurements.

12. The method of claim 11, wherein the indication of the null resource element pattern is included in downlink control information (DCI), the null resource element pattern being indicated in the DCI using:
a value of an antenna port field that also indicates one or more demodulation reference signal (DMRS) ports for the UE and a quantity of DMRS code-division multiplexing groups without data, or
a value of a zero power downlink reference signal resource set.

13. The method of claim 11, further comprising receiving a CSI report configuration that requests the UE to report the recommended null resource element pattern in the CSI report.

14. The method of claim 11, further comprising interpreting the null resource element pattern in accordance with a rank used by the UE, a combination of demodulation reference signal (DMRS) ports used by the UE, a maximum rank configured for the UE, or a combination thereof.

15. The method of claim 11, wherein performing the one or more demodulation interference measurements using the null resource element pattern is responsive at least in part to a maximum rank configured for physical downlink shared channel (PDSCH) reception of the UE satisfying a threshold.

16. The method of claim 11, wherein the null resource element pattern is indicated using a zero power channel state information reference signal resource set or a channel state information interference measurement reference signal.

17. A method of wireless communication performed at a base station, comprising:
receiving, from a user equipment (UE), a first indication indicating a recommended null resource element pattern or a recommended quantity of resource elements for a null resource element pattern in at least one of a UE capability report or a channel state information (CSI) report;

transmitting, to the UE, downlink control information (DCI) that includes a second indication indicating a particular null resource element pattern of a set of null resource element patterns,
at least one of the recommended null resource element pattern or the recommended quantity of resource elements included in the null resource element pattern depending on at least one of:
a maximum rank configured for physical downlink shared channel (PDSCH) reception of the UE, or
a precoding resource block group configuration; and
transmitting a downlink communication responsive at least in part to the particular null resource element pattern indicated in the DCI.

18. The method of claim 17, further comprising transmitting a configuration that indicates the set of null resource element patterns and selecting the particular null resource element pattern to be indicated in the DCI from the set of null resource element patterns.

19. The method of claim 18, wherein the configuration indicates different sets of null resource element patterns for at least one of different ranks or different combinations of demodulation reference signal (DMRS) ports.

20. The method of claim 17, further comprising:
indicating the particular null resource element pattern responsive at least in part to a quantity of receive antennas reported by the UE satisfying a threshold.

21. The method of claim 17, wherein the particular null resource element pattern is indicated in the DCI using a value of a zero power downlink reference signal resource set, one or more zero power downlink reference signals including one or more zero power channel state information reference signals.

22. The method of claim 17, wherein the particular null resource element pattern is indicated in the DCI using a value of a zero power downlink reference signal resource set, one or more zero power downlink reference signals including one or more channel state information interference measurement reference signals or one or more downlink reference signals for interference measurement.

23. The method of claim 17, wherein the particular null resource element pattern is responsive at least in part to the first indication.

24. The method of claim 17, further comprising transmitting a CSI report configuration that requests the UE to report the recommended null resource element pattern or the recommended quantity of resource elements for the null resource element pattern in the CSI report.

25. The method of claim 17, wherein the particular null resource element pattern is indicated in the DCI using:
a value of an antenna port field that also indicates one or more demodulation reference signal (DMRS) ports for the UE and a quantity of DMRS code-division multiplexing groups without data, or
a value of a zero power downlink reference signal resource set.

26. A method of wireless communication performed at a base station, comprising:
receiving, from a user equipment (UE), an indication of a recommended null resource element pattern in at least one of a UE capability report or a channel state information (CSI) report, the indication of the recommended null resource element pattern indicating an arrangement of null resource elements in time and frequency within a resource block;
transmitting, to the UE, an indication of a null resource element pattern of a set of null resource element patterns responsive at least in part to the indication of the recommended null resource element pattern; and
transmitting a downlink communication to the UE responsive at least in part to the null resource element pattern.

27. The method of claim 26, wherein the indication of the null resource element pattern is included in downlink control information (DCI), the null resource element pattern being indicated in the DCI using:
a value of an antenna port field that also indicates one or more demodulation reference signal (DMRS) ports for the UE and a quantity of DMRS code-division multiplexing groups without data, or
a value of a zero power downlink reference signal resource set.

28. The method of claim 26, further comprising transmitting a CSI report configuration that requests the UE to report the recommended null resource element pattern in the CSI report.

29. The method of claim 26, wherein the null resource element pattern is interpreted in accordance with a rank used by the UE, a combination of demodulation reference signal (DMRS) ports used by the UE, a maximum rank configured for the UE, or a combination thereof.

30. The method of claim 26, wherein the null resource element pattern is indicated using a zero power channel state information reference signal resource set or a channel state information interference measurement reference signal.

* * * * *